(12) United States Patent
Millikin

(10) Patent No.: US 10,362,902 B2
(45) Date of Patent: Jul. 30, 2019

(54) HAND-SHIELD FOR COOKWARE AND KITCHEN UTENSILS

(71) Applicant: Rory Chesley Patrick Millikin, Kelowna (CA)

(72) Inventor: Rory Chesley Patrick Millikin, Kelowna (CA)

(*) Notice: Subject to any disclaimer, the term of this patent is extended or adjusted under 35 U.S.C. 154(b) by 301 days.

(21) Appl. No.: 15/213,240

(22) Filed: Jul. 18, 2016

(65) Prior Publication Data

US 2018/0014692 A1    Jan. 18, 2018

(51) Int. Cl.
*A47J 37/12* (2006.01)
*A47J 43/28* (2006.01)

(52) U.S. Cl.
CPC ............ *A47J 37/1271* (2013.01); *A47J 43/28* (2013.01)

(58) Field of Classification Search
CPC ............ A47J 36/36; A47J 37/12; A47J 43/28
USPC .................. 126/383.1; 99/407, 410; 426/438
See application file for complete search history.

(56) References Cited

U.S. PATENT DOCUMENTS

| | | | | |
|---|---|---|---|---|
| 4,258,694 A * | 3/1981 | Kato | ...................... | A47J 37/101 126/299 C |
| 4,266,527 A * | 5/1981 | Kato | ...................... | A47J 37/101 126/299 C |
| 4,321,859 A * | 3/1982 | Rimmeir | ............. | A47J 37/1295 99/416 |
| 4,508,027 A * | 4/1985 | McCord | ............. | A47J 37/1295 220/543 |
| 5,937,743 A * | 8/1999 | Overstreet | ............ | A47J 43/283 99/353 |
| 6,176,175 B1 * | 1/2001 | Moreth | ............... | A47J 37/1295 99/408 |
| 6,386,094 B1 * | 5/2002 | Stevenson | ........... | A47J 37/1295 99/336 |
| 7,500,427 B2 * | 3/2009 | Rosenzweig | ....... | A47J 37/1295 426/438 |
| 2013/0227816 A1 * | 9/2013 | Achiaz | .................... | A47J 43/28 16/110.1 |
| 2018/0242780 A1 * | 8/2018 | Larman | .................. | A47J 36/36 |

FOREIGN PATENT DOCUMENTS

CN      203524519 U  *  4/2014  ............. A47J 37/12

OTHER PUBLICATIONS

CN 203524519 U of Yang Y, English machine translation.*

* cited by examiner

*Primary Examiner* — Gregory L Huson
*Assistant Examiner* — Nikhil P Mashruwala
(74) *Attorney, Agent, or Firm* — Arjomand Law Group

(57) ABSTRACT

Methods and apparatus are disclosed to make the process of cooking safer, specifically cooking on hot burners or cooking with hot liquids such as oil. Presented methods and devices in accordance with the present disclosure generally comprise shields that may be temporarily or permanently attached to the body or the handle of cookware or utensils to protect a user's hand from convective and/or radiative heat and from hot liquid splash.

20 Claims, 26 Drawing Sheets

HAND-SHIELD FOR COOKWARE AND KITCHEN UTENSILS

CROSS-REFERENCE(S) TO RELATED APPLICATION(S)

The present application is a Continuation-In-Part (CIP) of and claims the benefit of the filing date of U.S. application Ser. No. 14/944,168, filed on 17 Nov. 2015, entitled "Deep Frying Basket Oil Shied," the contents of which are hereby expressly incorporated by reference in their entirety, under 35 U.S.C. § 120.

TECHNICAL FIELD

This application relates generally to the cooking apparatus, and more particularly, to a shield for protecting one's hand while using such apparatus.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
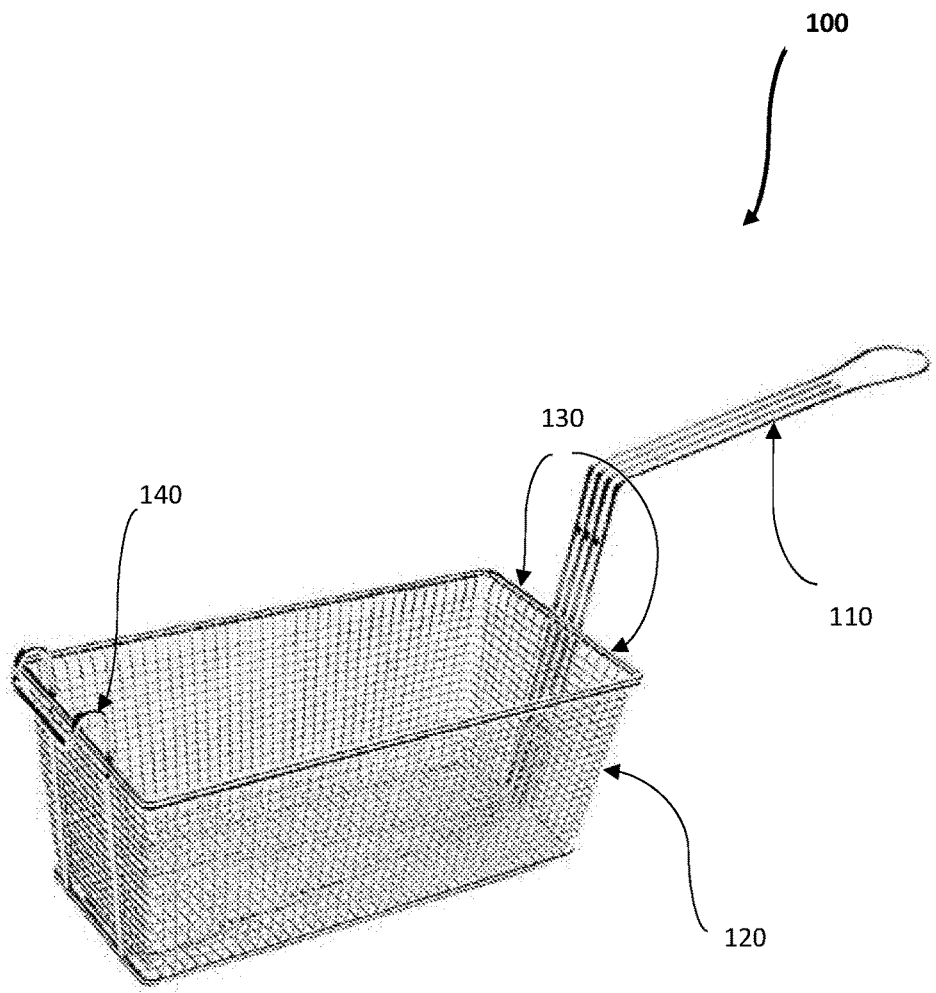
FIG. 1 is an isometric view of an example fryer basket for deep frying.

While the present disclosure is described with reference to several illustrative embodiments, it should be clear that the present disclosure is not limited to such embodiments. Therefore, the description of the embodiments provided herein is illustrative of the present disclosure and should not limit the scope of the disclosure as claimed. In addition, while the following description mostly references shields for frying baskets and cooking utensils, it will be appreciated that the disclosure may include other types of cooking apparatus with or without long handles.

A popular method of cooking is to fry or deep fry many food items. A brief list of foods that may be deep fried include various vegetables, french fries, potato chips, chicken, pork, beef, candy bars, ice cream, etc. Many other types of food are amenable to frying. Frying generally involves sautéing or immersing the food item in a high-temperature fat-based solution, such as in cooking oil (e.g., canola oil, peanut oil, vegetable oil, olive oil, liquefied shortening, etc.) until the food is browned or cooked, though other liquids can be used.

While fried foods and the fryers used to cook the fried foods are popular, the temperatures found in the frying liquids are quite high, often greater than 300 degrees Fahrenheit. Customarily, food, such as potatoes and chicken parts, are placed in metal baskets constructed with wire-mesh and are lowered by hand into the hot liquid and left to be cooked. Thus, splashing hot liquid, for example as a result of objects falling into the liquid, may accidentally land on body parts, specially hands, and cause severe injuries. Same danger exists while using utensils, such as spatula, to fry or cook food in very hot liquids or scraper, to clean a frying pan. Therefore, an apparatus for preventing the hot scattering liquid from reaching the user's hand is desirable.

As set forth in the detailed description, in accordance with various embodiments of the present disclosure systems, methods and apparatuses are provided to make cooking and frying safer. With reference to the figures attached hereto, methods and devices in accordance with the present disclosure generally comprise foldable, non-foldable, slideable, retractable, and bendable shields that may be temporarily or permanently attached to the body or to the handle of cookware and utensils. These shields may be made, for example, from plastic, metal, wood, or other natural or synthetic materials.

In addition to safety, another advantage of the present disclosure is the easy and cost effective retrofitting of the existing cooking apparatus. The following disclosed embodiments may be described in terms of functional components and/or various processing steps. Each functional component may include any number of parts configured to perform specified functions and achieve various results. Those skilled in art will recognize that the disclosed apparatus and/or method are not limited to food preparation and may be used for protecting against serious injuries while working with any hot or dangerous liquid. Those skilled in art will also realize how to manufacture and construct the disclosed embodiments without undue experimentation and without the need for the manufacturing details to be described in this specification.

The detailed description herein makes use of various exemplary embodiments to assist in disclosing the present invention. While these exemplary embodiments are described in sufficient detail to enable those skilled in the art to practice the invention, it should be understood that other embodiments may be realized and that different combinations and modifications of structures, arrangements, applications, proportions, elements, materials, or components used in the practice of the present disclosure, in addition to those not specifically recited, can be varied or otherwise particularly adapted to specific environments, manufacturing specifications, design parameters or other operating requirements without departing from the scope of the present disclosure and are intended to be included in this disclosure. Thus, the detailed description herein is presented for purposes of illustration only and not of limitation.

In accordance with an exemplary embodiment of the present disclosure, the system, methods, and devices disclosed herein discuss frying foods and the safety considerations related thereto. The terms "cooking" and "frying" and formatives thereof may be used interchangeably herein. Other mechanisms and devices for cooking food besides frying fall within the scope of the present disclosure, such as boiling, blanching, steaming, poaching, simmering, steeping, and the like. For consistency, "frying" will be used throughout without limiting the methods of cooking for use in conjunction with embodiments of the present disclosure. In addition, while the following description mostly references shields for preventing splashing hot liquid from landing on the user's hand, it will be appreciated that the disclosed shields may be used with any tool, utensil and/or cookware to protect the user's hand from any convective and/or radiative heat, such as the convective and/or radiative heat of a burner on which the user cooks.

Additionally, in certain embodiments water may be used in place of cooking oil in order to boil, poach, blanch or otherwise cook certain foods. The foods are housed within the basket and cooked in the heated water in a water chamber, where the water chamber takes the place of the oil chamber. Such foods that may be cooked by this process comprise pasta products and vegetables. Examples of heating mechanisms used in connection with maintaining and regulating the temperature of the oil in accordance with the present disclosure include, but are not limited to, various gas and electric heating elements, as well as other now known or as yet unknown heating mechanism suitable for heating oil.

According to various exemplary embodiments of the present invention, devices used herein are available in numerous sizes and/or capacities. For example, the device may be available in commercial sizes for use by restaurants and other food-frying establishments and large food manufacturers and producers that must produce hundreds, if not thousands, of pounds of fried food every day. Commercial devices may range in size depending on the desired capacity for the device. Other embodiments of the invention provide a device that is amenable to use by smaller businesses and food stands, or even in a user's home. For example, devices in accordance with the present invention may be configured to be easily retrofitted to existing kitchen cooking devices and appliances such as skillets. Those skilled in the art will appreciate that various embodiments of the present invention can shield a person's hand against projectiles of flying heated liquid while the person is using an apparatus to manipulate the liquid.

The materials used for the various components described herein may be various heat resistant materials, such as high temperature plastics, ceramics, metals, and the like that will not be detrimentally effected by the temperature of the oil and heating elements described herein. All sizes and capacities of devices discussed are contemplated within the scope of the present invention.

Devices in accordance with the present disclosure are generally readily cleanable. For example, in some embodiments the various components, such as the shields disclosed herein, are removable or hinged to facilitate ease of cleaning. For example, the shield may be rotatable around a hinge or moveable on a rail or slideable in a channel or track to provide access to locations that are otherwise difficult to reach and clean. In other embodiments, components of or the entire shield may be completely or partially removable to facilitate cleaning.

The baskets mentioned in some embodiments disclosed herein may be of any shape or size (e.g., circular, square, rectangular or otherwise). Depositing food in the baskets may occur in any suitable way. For example, food may simply be deposited manually by an operator into the basket. Alternatively, the depositing of the food may be automated, for example via robotic/mechanical arms, conveyors and transport mechanisms which transport the food. In various embodiments, baskets in accordance with the present invention may be designed for specific food types, such as baskets with vertical basket slots for "planar" foods (e.g., hash brown patties, chicken patties, etc.). For example, for hash brown patties, it may be desirable to keep the patties upright.

FIG. 1 illustrates a fryer basket 100 comprising a handle 110, a metal basket/container 120, which itself includes a reinforced outer edge 130, and a hook 140 for hanging the basket for example on the side of a fryer oil-bay. Customarily, all parts of fryer basket 100 are made of stainless steel. Food is placed in basket 120 and is lowered into the hot oil until the oil completely covers the food at which point fryer basket 100 is left partially or fully submerged for a predetermined length of time, by hanging it on a side of the fryer oil-bay.

Figure 2A:
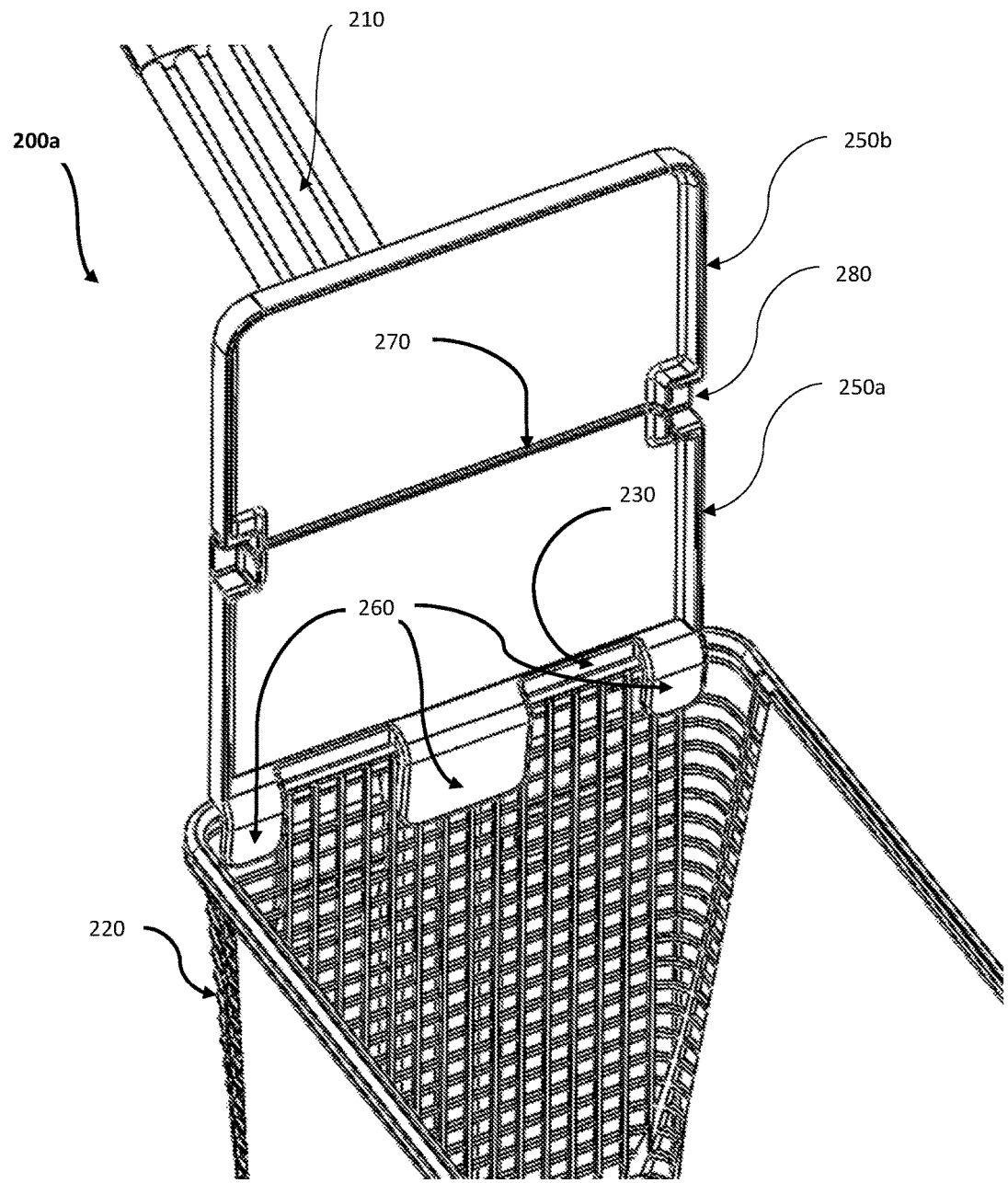
FIG. 2A is a front isometric view of a fryer basket with an example oil shield.
Figure 3:
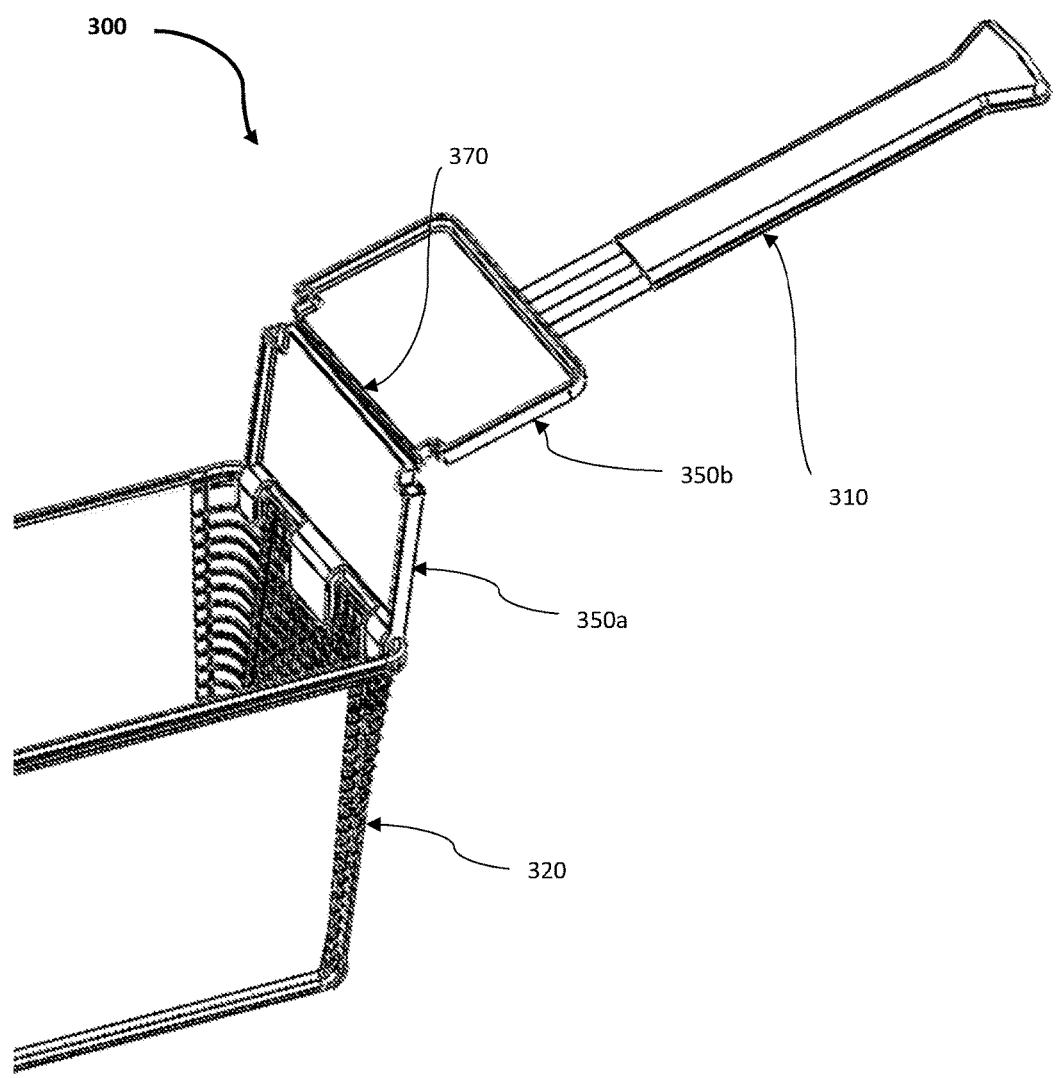
FIG. 3 is an isometric view of a fryer basket with a folded example oil shield.

FIG. 2A shows a partial front view of a shielded frying basket 200a. In FIG. 2A, an exemplary foldable oil shield that comprises a fixed part 250a and a folding part 250b, is detachably/removably/temporarily attached to basket/container 220 by flexible, elastic, or spring-loaded clamps 260. (The word "fixed" is used to indicate that once attached, part 450a does not move with respect to the frying basket.) The fixed part 250a of the oil shield is clamped to the edge 230 of basket 220 to form a wall between handle 210 and basket 220. This wall need not be made of solid material and may be perforated itself, similar to the perforated sheets used in pan-cover or splatter-screens that are used to cover skillets and frying pans. In such embodiments the user can see through the protective wall and still be protected from flying hot liquid. In this embodiment the folding part 250b of the oil shield may be kept in the same plane as the fixed part 250a or may be turned around axis 270 to stay closer or on the handle 210, as shown in FIG. 3. In various embodiments the oil shield may be made of one piece and no part of the oil shield may rotate with respect to the other part. In some embodiments a single-piece sheet may be bent to create two parts 250a and 250b in two different planes but fixed with respect to each other. In other embodiments similar oil shields may be placed on more than one side of the oil shield.

In the embodiment shown in FIG. 2A, different known mechanisms 280 may help the folding part 250b of the oil shield to stay at any desired position with respect to the fixed part 250a. In various embodiments, mechanisms 280 may act as hinges and/or even as position-locking mechanisms. In some embodiments clamps 260 may be made from metal, plastic, or any other material suited for making a semi-rigid clamps that can grab edge 230 as a result of an elastic deformation.

Figure 2B:
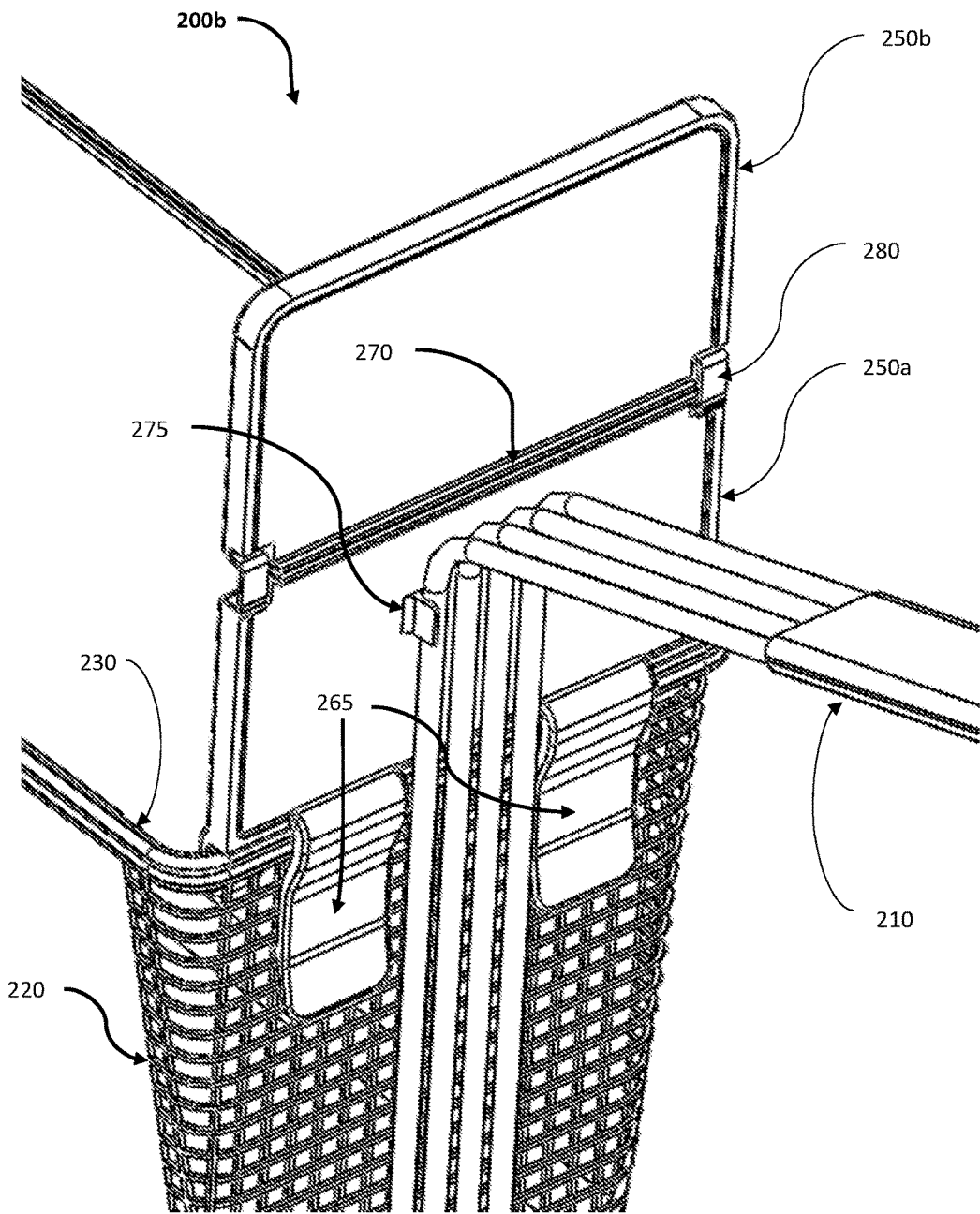
FIG. 2B is a back isometric view of a fryer basket with an example oil shield.

FIG. 2B shows a partial back view of the shielded frying basket 200b. In FIG. 2B, an exemplary foldable oil shield that comprises a fixed part 250a and a folding part 250b, is detachably/removably/temporarily attached to basket 220 by flexible, spring-loaded or elastic clamps 265. The fixed part 250a of the oil shield is clamped to edge 230 of basket 220 to form a protective wall between handle 210 and basket 220. In this embodiment the folding part 250b of the oil shield may be kept in the same plane as the fixed part 250a or may be turned around axis 270 to stay closer or on the handle 210. In this embodiment additional clamps 275 are also used to clamp the fixed part 250a of the oil shield to handle 210. In various embodiments the folding part 250b of the oil shield may also have one or more clamps similar to clamp 275 to be attached to handle 210 while being folded and placed on the handle 210.

In the embodiment shown in FIG. 2B, different known mechanisms 280 may help the folding part 250b of the oil shield to stay at any desired position with respect to the fixed part 250a. In various embodiments, mechanisms 280 may act as hinges and/or even as position-locking mechanisms. In some embodiments clamps 265 may be made from metal, plastic, or any other material suited for making clamps that can grab and attach to edge 230.

FIG. 3 illustrates a shielded frying basket 300 with a foldable oil shield. In FIG. 3 the foldable part 350b of the oil shield is turned around axis 370 and is placed over handle 310. The fixed part 350a of the oil shield is clamped to the edge of basket/container 320 to form a protective wall between handle 310 and basket 320 and to prevent any hot liquid to splash to the hand of a user holding handle 310. A folded shield as shown in FIG. 3 makes it easy to stack the baskets inside each other and provides a better field of view of the food within the basket.

Figure 4:
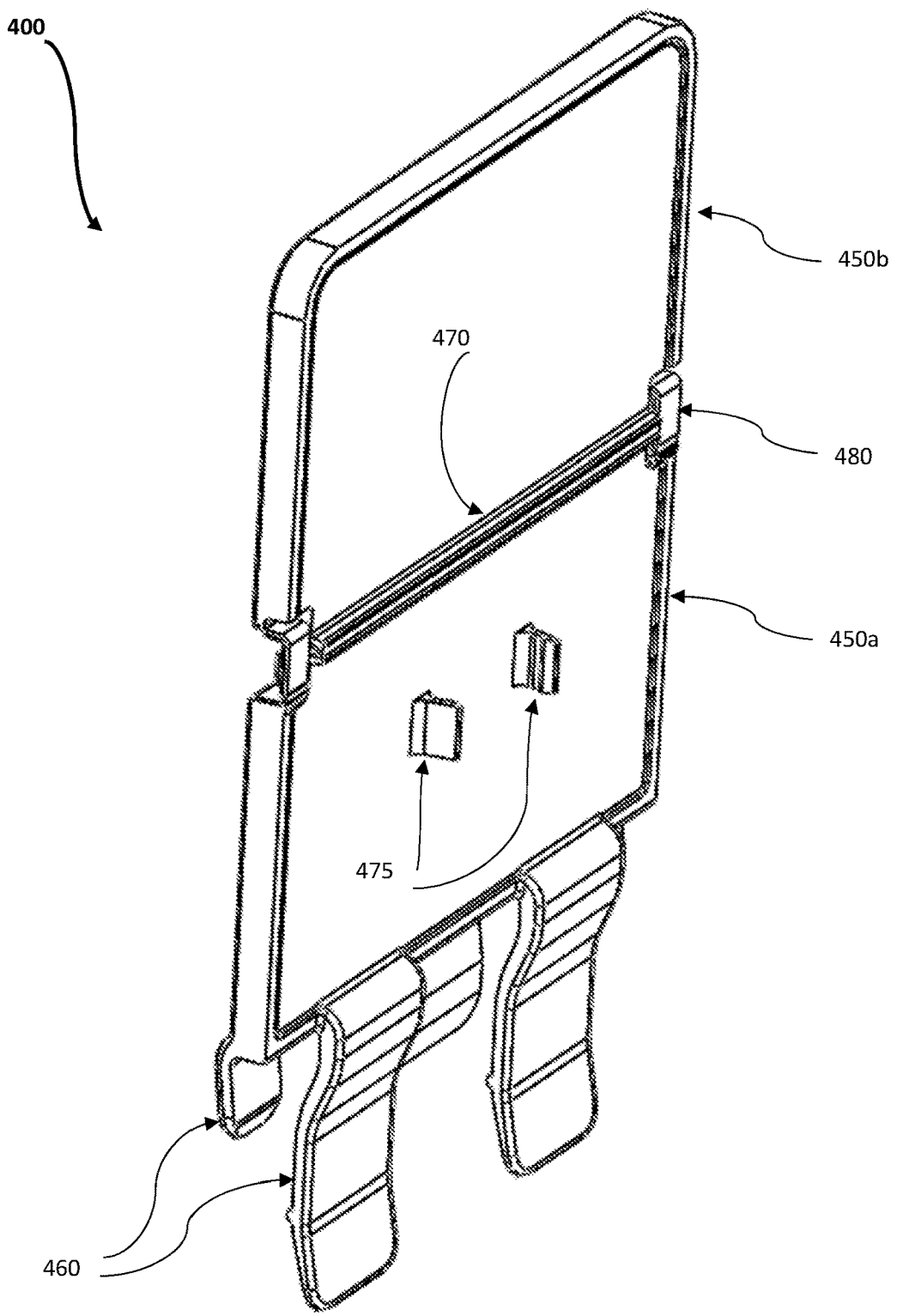
FIG. 4 is an isometric view of an example foldable oil shield.

FIG. 4 is an isometric view of an example foldable oil shield 400. In this embodiment solid or spring-loaded clamps 460, which are used to attach the oil shield 400 to the frying baskets, are attached to or are a part of the fixed part 450a of the oil shield 400. In this embodiment additional clamps 475 are used to also clamp the fixed part 450a of the oil shield 400 to the basket handle. In various embodiments the folding part 450b of the oil shield may also have clamps similar to clamp 475 to be attached to the basket handle while folded and on the basket handle. As shown in FIG. 4, the entire axis of rotation 470 of the folding part 450b with respect to the fixed part 450a may be a hinge or multiple hinges made from plastic or metal or other materials. In this embodiment the hinge is simply made of a thin plastic sheet that is attached or is a part of the fixed part 450a and folding part 450b.

In the embodiment shown in FIG. 4, different known mechanisms 480 may help the folding part 450b of the oil shield 400 to stay at any desired position with respect to the fixed part 450a. In various embodiments, mechanisms 480 may act as hinges and/or even as position-locking mechanisms. In some embodiments clamps 460 may be made from metal, plastic, or any other material suited for making clamps that can grab an edge of the frying basket.

Figure 5:
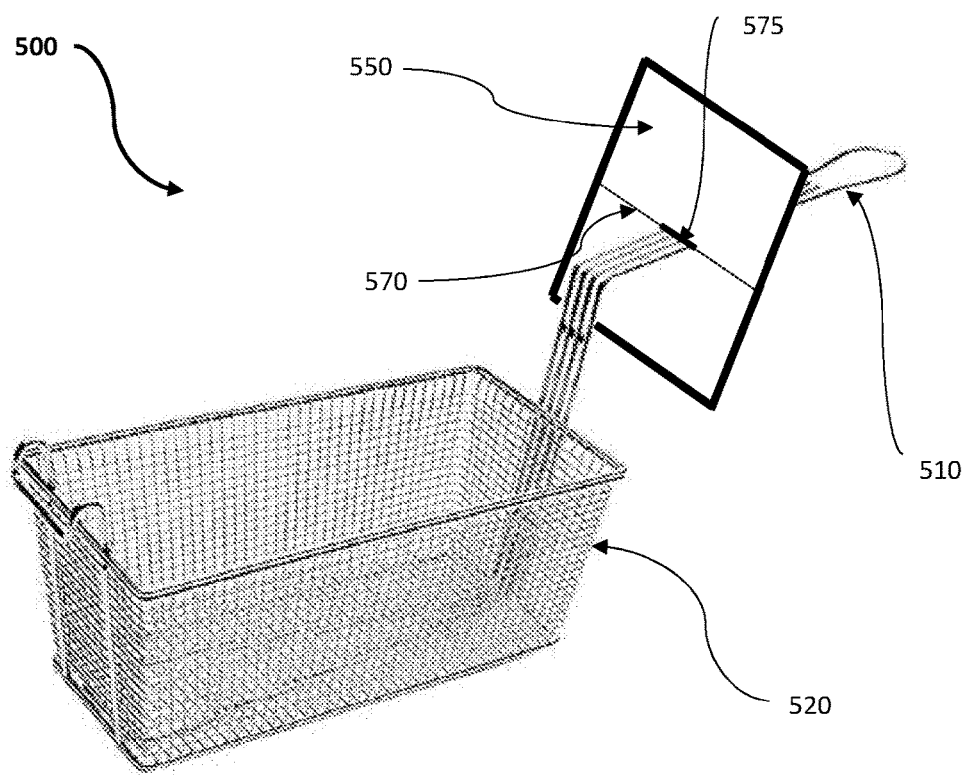
FIG. 5 is an isometric view of a fryer basket with yet another example oil shield.

FIG. 5 shows an isometric view of a shielded fryer basket 500. In this embodiment the oil shield 550 is similar to the cross-guard of a sword and may be foldable where the top and the bottom parts of the oil shield 550 rotate around axis 570 with respect to each other, as illustrated in FIG. 3, or be non-foldable and be made of, for example, a single sheet of hard plastic or metal. In the embodiment of FIG. 5 handle 510 passes through the opening 575. In other embodiments opening slot 575 may continue to one edge of the shield 550 to allow handle 510, which is attached to basket/container 520, to enter the shield 550 sideways. In some foldable embodiments the top part of shield 550 may also have small clamps, similar to clamps 275. In some embodiments a single-piece sheet of material may be bent into two different planes, such that one plane can be placed on the handle 510 while the other acts as a protective wall.

In various embodiments the oil shield may be as tall and as wide as desired to even block hot liquid drops flying from outside and around the frying basket toward the user's hand. Oil shields disclosed above may be placed on any side of the frying baskets even if they do not protect the handle; however, it is preferable to use the oil shields to at least protect the handle from splattering fluid.

Figure 6:
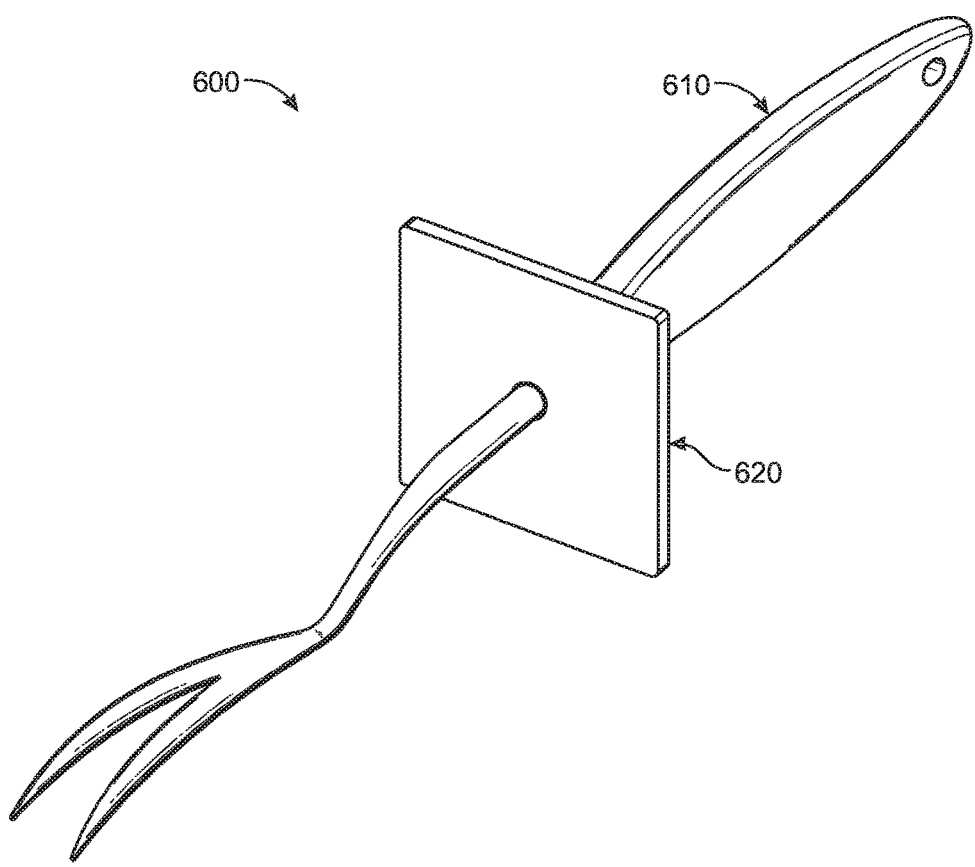
FIG. 6 is an isometric view of a cooking utensil with an example oil shield.

FIG. 6 is an isometric view of a shielded cooking utensil 600 with an example oil shield 620 attached to the utensil's handle 610. In this example embodiment a flat plate 620 with a hole in its middle is permanently attached to the handle 610. In some embodiments the flat plate 620 may be removeably attached to the handle 610, for example by unscrewing the utensil tip from its handle 610 and placing the shield 620 in between the two pieces before screwing them back together.

Figure 7:
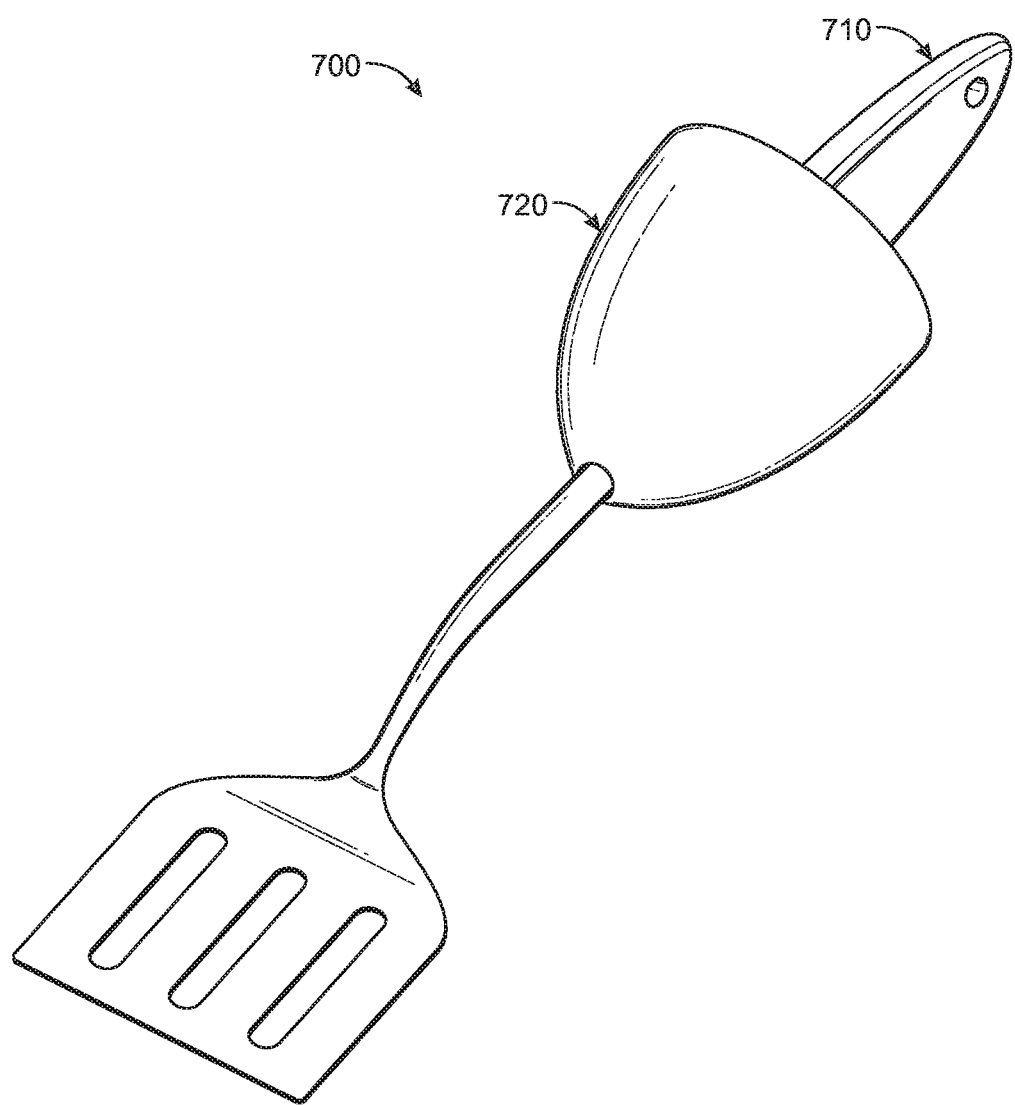
FIG. 7 is an isometric view of a cooking utensil with another example oil shield.

FIG. 7 is an isometric view of a shielded cooking utensil 700 with an example oil shield 720 attached to the utensil's handle 710. This example embodiment has some similarities with the shield illustrated in FIG. 6, but in this embodiment the oil-shield 720 can completely cover the user's hand even from possible vertical dripping of hot oil onto the user's hand. For example, in some large hamburger paddy or panini presses when the cover is opened the hot oil or water may vertically drip on the user's hand and burn his/her skin. In such cases a flat oil-shield, as shown in FIG. 6, cannot prevent the droplets from landing on the user's hand; however, a shield that completely covers the user's hand, such as the one illustrated in FIG. 7, will prevent any potential accident.

Figure 8:
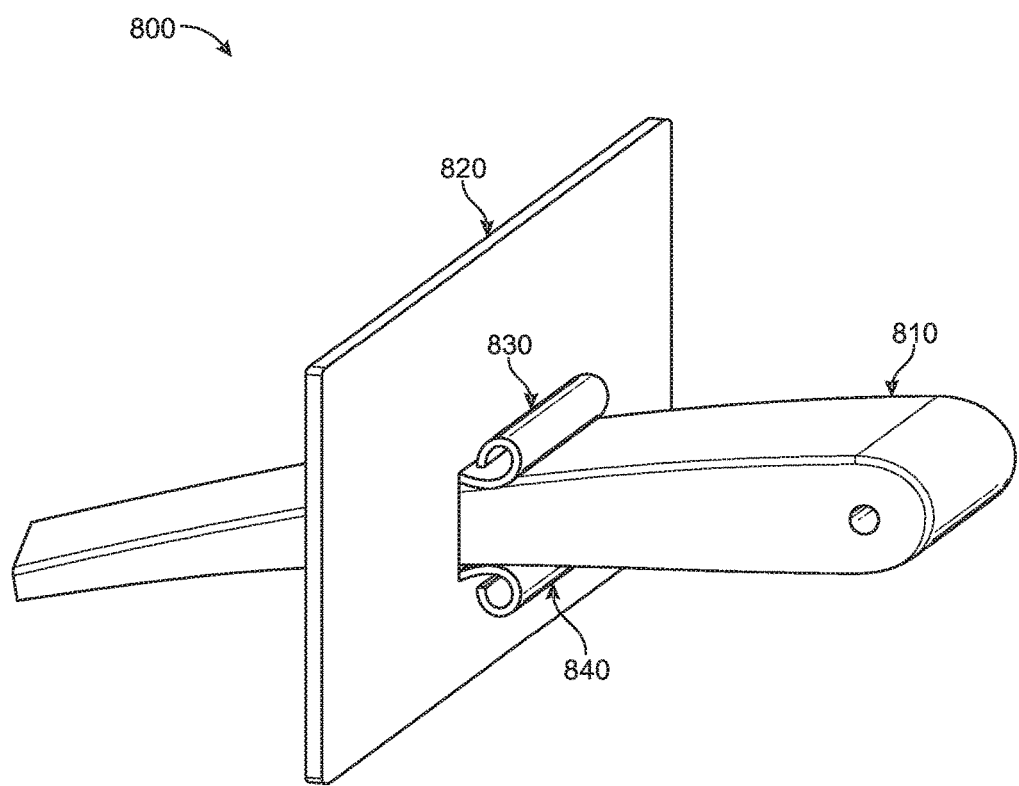
FIG. 8 is an isometric view of a cooking utensil handle with yet another example oil shield.

FIG. 8 is an isometric view of a shielded utensil handle 800 with yet another example oil shield 820 mounted on handle 810. In this embodiment shield 820 is temporarily secured on the handle 810 by the spring leaves 830 and 840. While it is easy to change the position of the oil-shield 820 on the handle 810 or remove and install it on the handle 810, it will stay securely in place if not forced to move.

Figure 9:
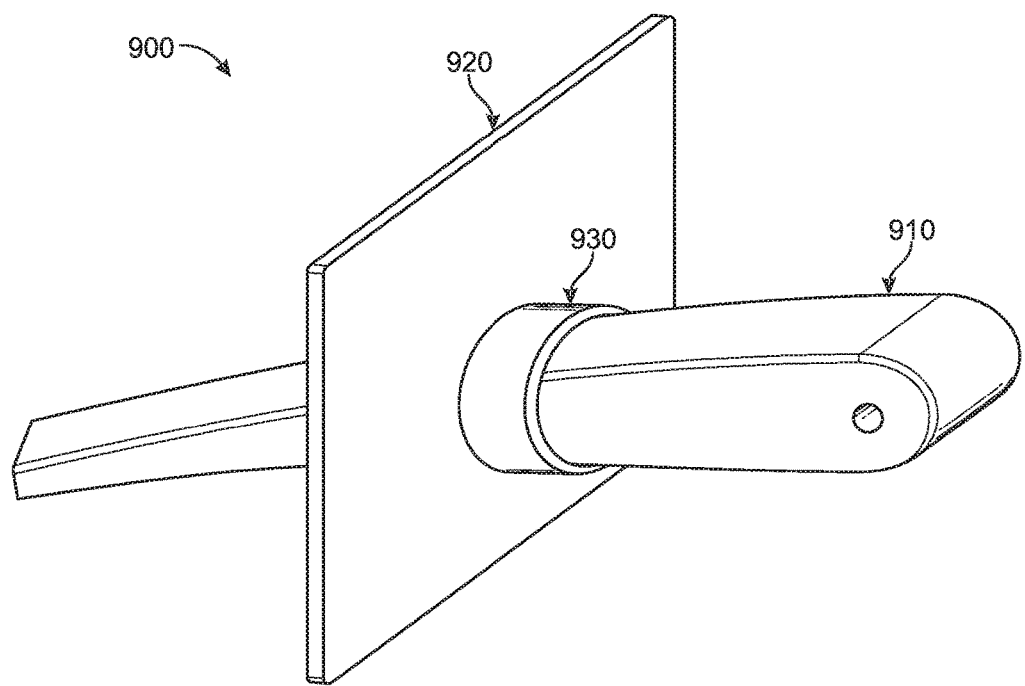
FIG. 9 is an isometric view of a cooking utensil handle with yet another example oil shield.

FIG. 9 is an isometric view of a shielded utensil handle 900 with yet another example oil shield 920 mounted on handle 910. In this embodiment an additional collar 930, which may be made of an elastic material, acts similarly to the spring leaves 830 and 840 shown in FIG. 8. This collar 930 also helps to keep the oil-shield 920 in a substantially perpendicular orientation with respect to handle 910. In various embodiments the collar 930 may be permanently glued to handle 910. While the oil-shields in many of the disclosed embodiments are illustrated as rectangular flat plates, they may have any shape or form as desired.

Figure 10:
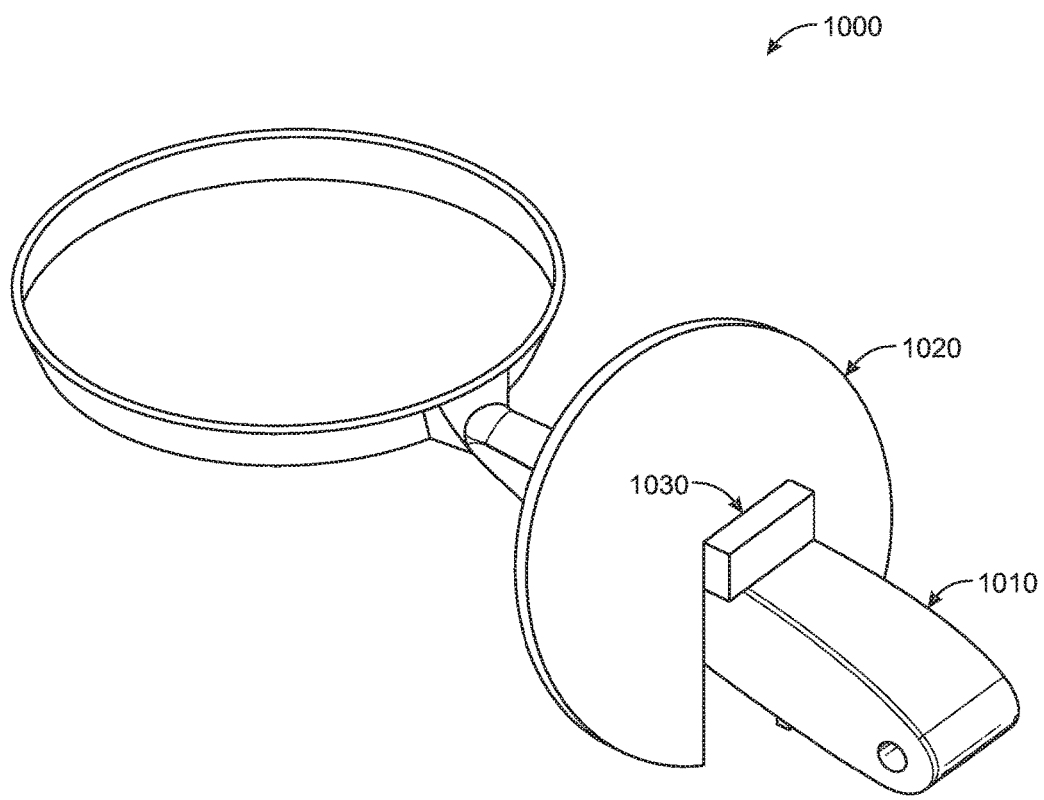
FIG. 10 is an isometric view of a cooking utensil with yet another example oil shield.

FIG. 10 is an isometric view of a shielded cooking utensil 1000 with an example oil shield 1020 attached to the utensil's handle 1010. In this embodiment the oil-shield 1020 has a radial opening that allows the oil-shield 1020 to simply sit on the handle of the utensil 1010. The magnet 1030, shown in FIG. 10, will removeably attach the oil-shield 1020 to any steel handle and keep the oil-shield 1020 in place.

Figure 11:
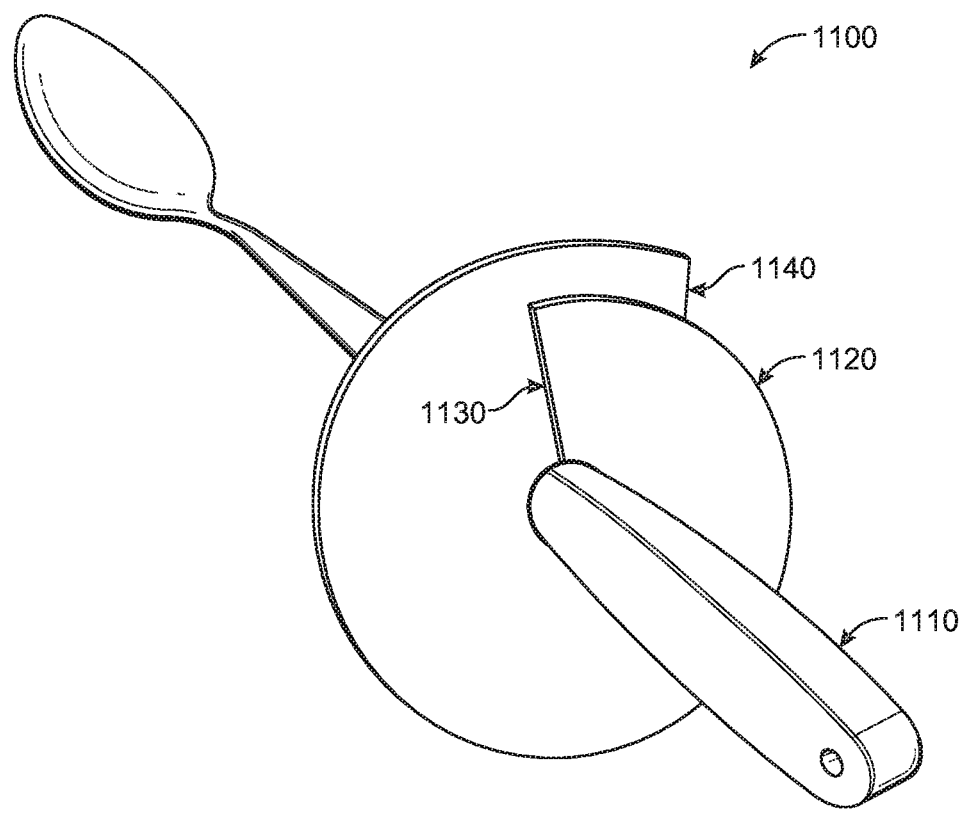
FIG. 11 is an isometric view of a cooking utensil with yet another example oil shield.

FIG. 11 is an isometric view of a shielded cooking utensil 1100 with an example oil shield 1120 attached to the utensil's handle 1110. The oil-shield 1120 in this embodiment may be placed on the utensils handles by pulling the two edges 1130 and 1140 apart from each other so that the utensil's handle 1110 can reach the hole in the middle of the oil-shield 1120. After placing the shield 1120 around the handle, the created gap between the two edges 1130 and 1140 may or may not be closed.

Figure 12:
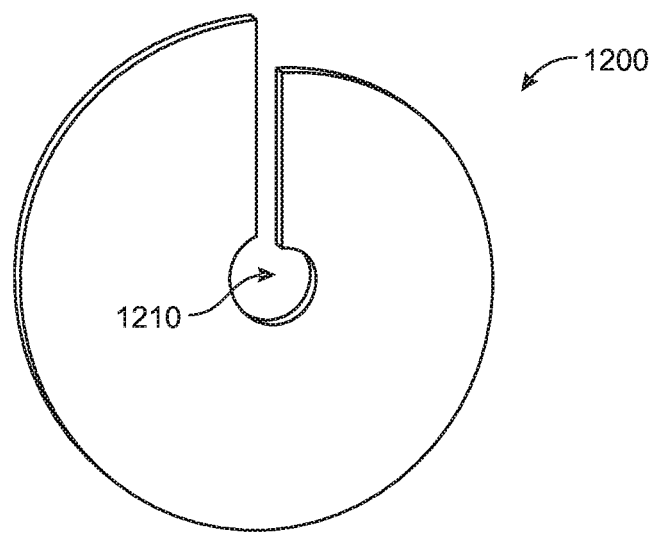
FIG. 12 is an isometric view of another example oil shield for a cooking utensil.

FIG. 12 is an isometric view of another example oil shield 1200 for a cooking utensil. In this example embodiment, which to some extent is similar to the embodiment of FIG. 11, the two edges of the radial slot are not overlapping but may need to be pulled apart to be able to place the oil-shield 1200 around a utensil's handle.

Figure 13:
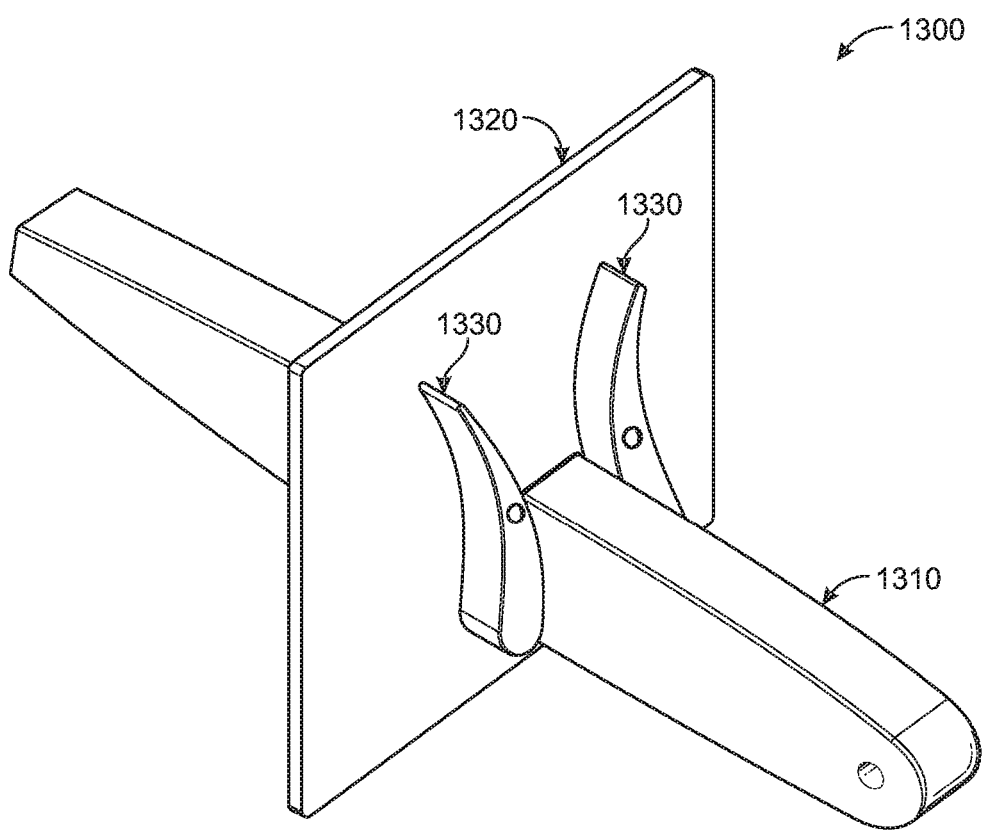
FIG. 13 is an isometric view of a cooking utensil handle with yet another example oil shield.

FIG. 13 is an isometric view of a shielded utensil handle 1300 with yet another example oil shield 1320 mounted on the utensil's handle 1310. In this embodiment, two spring loaded clips 1330, which are permanently and rotateably attached to the shield 1320, keep the shield 1320 in place. In various embodiments the clips 1330 may be on two sides of a hole, such as the hole in FIG. 6, or on two sides of a slot, such as the radial opening in FIG. 10. A shied 1320 with a hole can slip over handle 1310 while a shield 1320 with a slot can simply be placed over the handle 1310.

Figure 14:
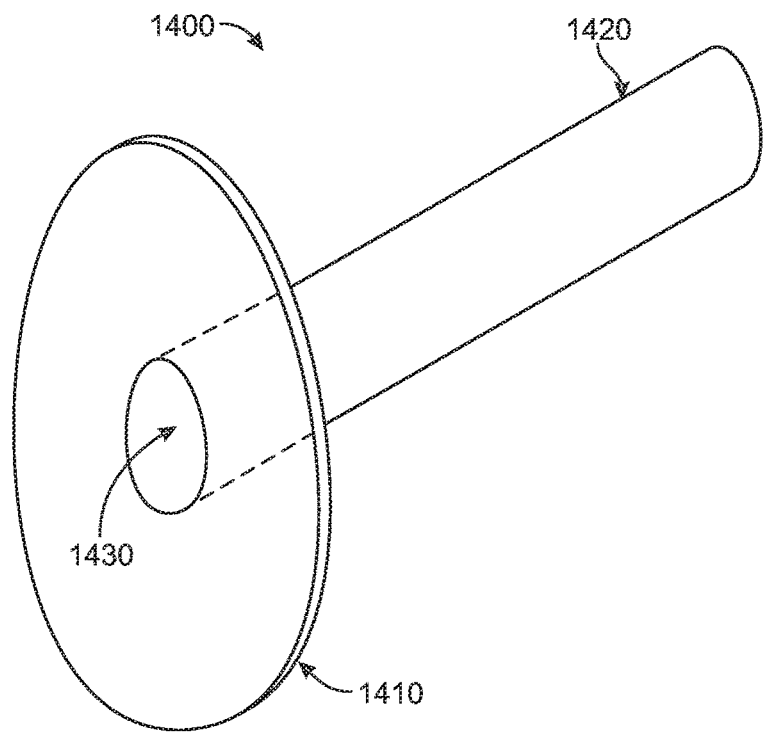
FIG. 14 is an isometric view of yet another example oil shield for a cooking utensil handle.

FIG. 14 is an isometric view of yet another example oil shield 1400 for any cooking utensil having a long handle. In this example embodiment the oil shield 1400 is preferably made of a durable or disposable heat-resistant elastic material comprising of a shield component 1410 and a handle cover/sleeve 1420. The oil-shield 1400, illustrated in FIG. 14, completely covers a part of any utensil or cookware handle and, in addition to preventing any oil splash from reaching the user's hand, prevents the heat of the handle from burning the user's hand.

Figure 15:
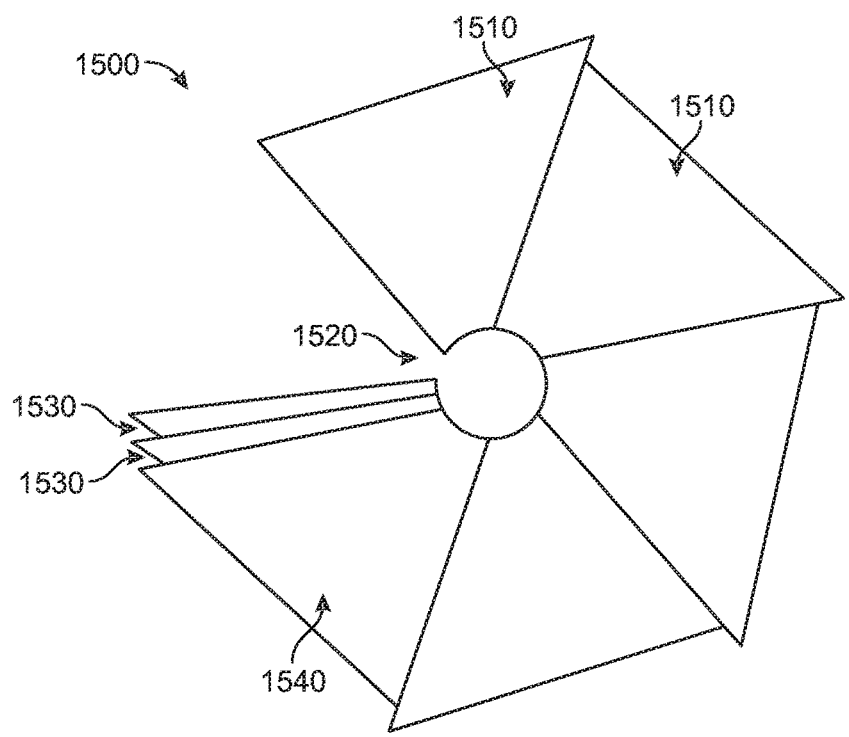
FIG. 15 is a plan view of yet another example oil shield for a cooking utensil handle.

FIG. 15 is a plan view of an example multi-piece oil-shield 1500 for a cooking utensil handle. In this embodiment the oil-shield 1500 has several components 1510 which fold or slide over each other, much like the Japanese folding hand-held fans. The components 1510 are configured to form a hole 1520, through which a utensil's handle may be placed. As illustrated in FIG. 15, components 1530 are folded or slid under component 1540 to facilitate placing shield 1500 around a utensil's handle.

Figure 16:
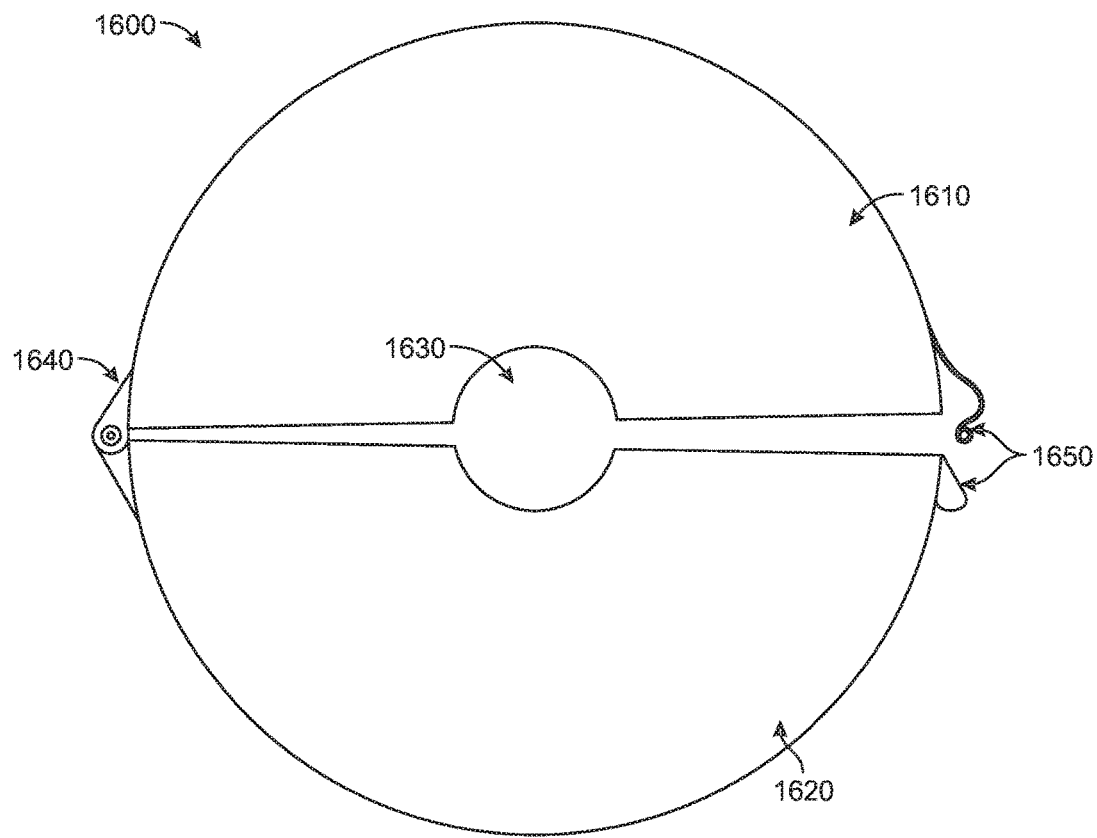
FIG. 16 is a plan view of yet another example oil shield for a cooking utensil handle.

FIG. 16 is a plan view of another example oil shield 1600 for a cooking utensil handle. This embodiment may be constructed by connecting the two half-circular parts 1610 and 1620 by a hinge 1640. The two half-circular parts 1610 and 1620 are further constructed to create an opening 1630 for placing the oil shield 1600 around the utensil handle. In various embodiments, the two half-circular parts 1610 and 1620 may be temporarily closed by a latch 1650 or a magnet or other known mechanisms.

Figure 17:
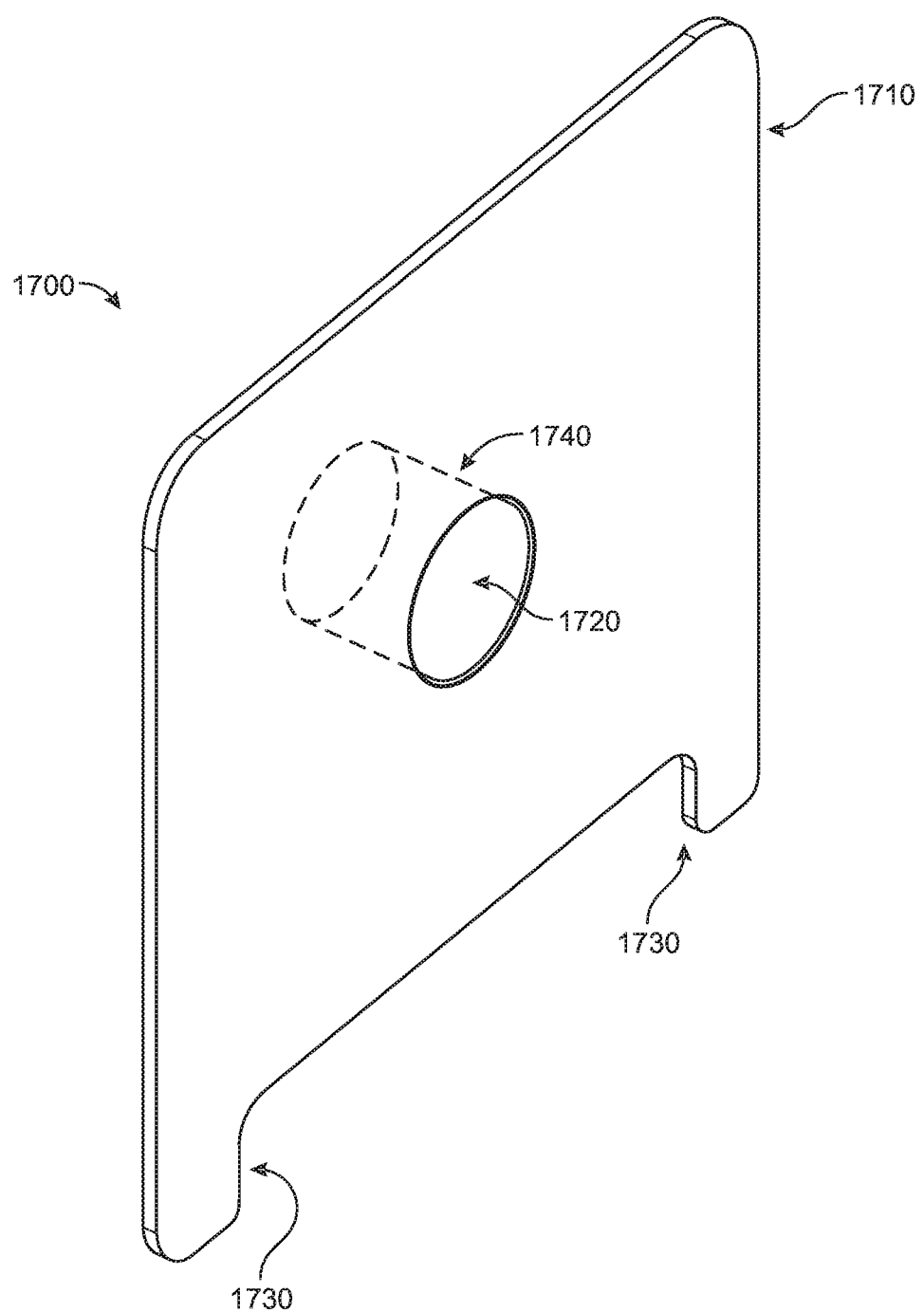
FIG. 17 is an isometric view of yet another example oil shield for a cooking utensil handle.

FIG. 17 is an isometric view 1700 of yet another example oil shield 1710 for a cooking utensil handle. In this example embodiment, which to some extent is similar to the embodiment of FIG. 6, the oil-shield 1710, in addition to a collar 1740, has two bases/feet 1730 to keep the shield 1710 from becoming contaminated while resting on a surface such as a kitchen countertop. In various embodiments the collar 1740 may be constructed from elastic material to keep the shield 1710 firmly in place while the utensil handle is inside the opening 1720.

Figure 18:
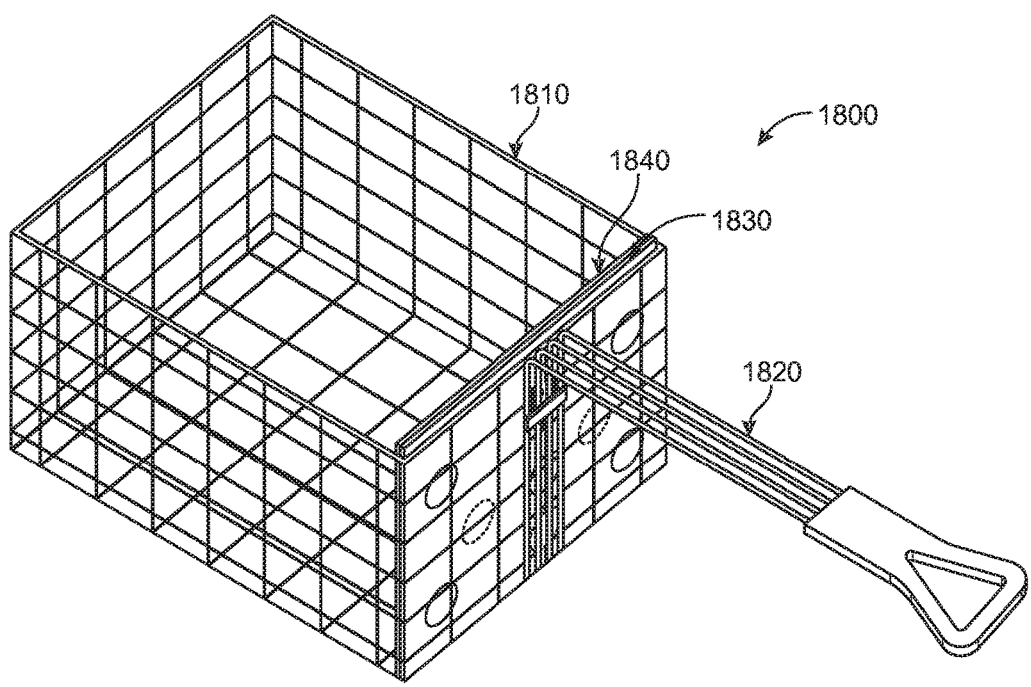
FIG. 18 is an isometric view of an example double walled cookware for deep frying.

FIG. 18 is an isometric view of an example shielded fryer basket 1800, having a double-walled shield constructed by plates 1830 and 1840. In this embodiment the two plates 1830 and 1840 are permanently or removeably placed adjacent to a side-wall of the frying basket 1810, at a small distance from each other, such that fluid can freely move between the two plates 1830 and 1840. As shown in FIG. 18, each of the two plates 1830 and 1840 have multiple holes; however, none of the holes/openings overlap each other and, therefore, while oil can enter fryer basket 1810, no droplets of hot oil can fly out of the basket through the combination of plates 1830 and 1840. Either or both of these plates may be constructed to extend upward and further protect the user's hand on the handle 1820. In various embodiments any or all side-walls of basket 1810 may be protected with similar plates as 1830 and 1840.

Figure 19:
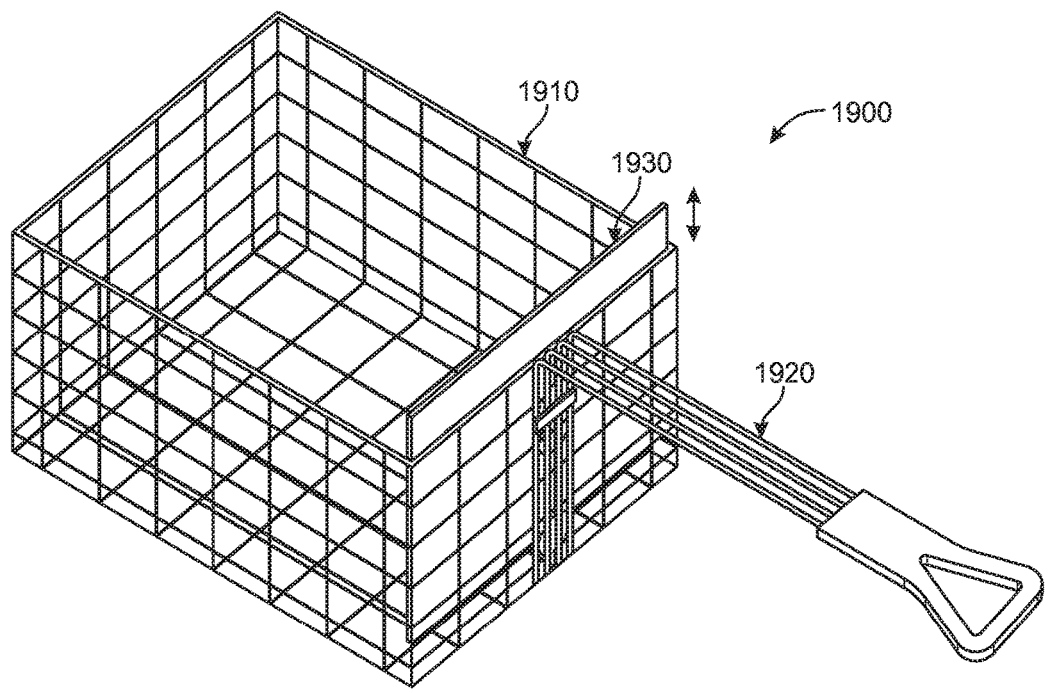
FIG. 19 is an isometric view of an example oil shield for a cookware.

FIG. 19 is an isometric view of an example shielded fryer basket 1900, having an oil-shield 1930. In this example embodiment a substantially flat plate 1930 may be slideably placed adjacent to a side-wall of fryer basket 1910 and be moved up or down, as desired, to protect the user's hand on the handle 1920.

Figure 20:
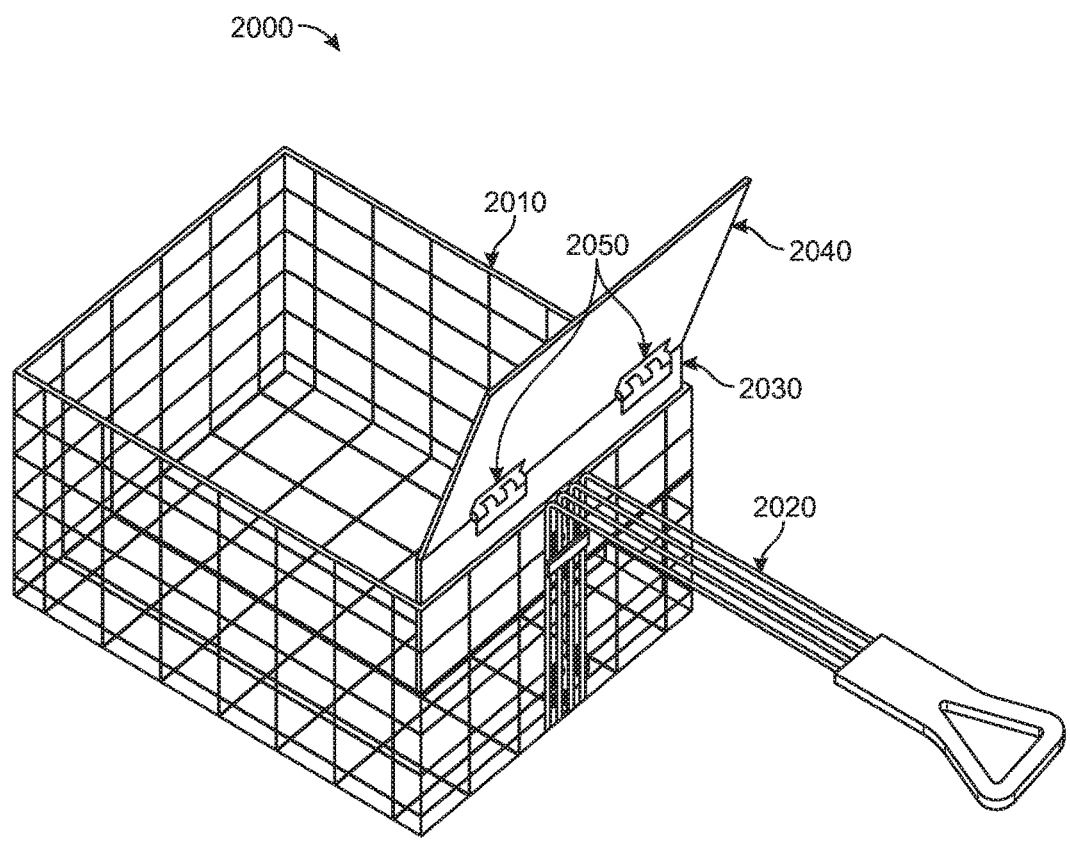
FIG. 20 is an isometric view of another example oil shield for a cookware.

FIG. 20 is an isometric view of an example shielded fryer basket 2000, having an oil-shield 2030 and 2040. In this example embodiment, which to some extent is similar to the embodiment of FIG. 19, the oil-shield is composed of two plates 2030 and 2040, which are hinged together by hinges 2050. Here the oil-shield may also be slideably placed adjacent to a side-wall of fryer basket 2010 and be moved up or down, as desired, to protect the user's hand on the handle 2020. Additionally, plate 2040 can be desirably rotated around hinges 2050 to better protect the user's hand on the handle 2020. In this embodiment plate 2040 cannot rotate under its own wait unless it is manipulated by the user.

Figure 21A:
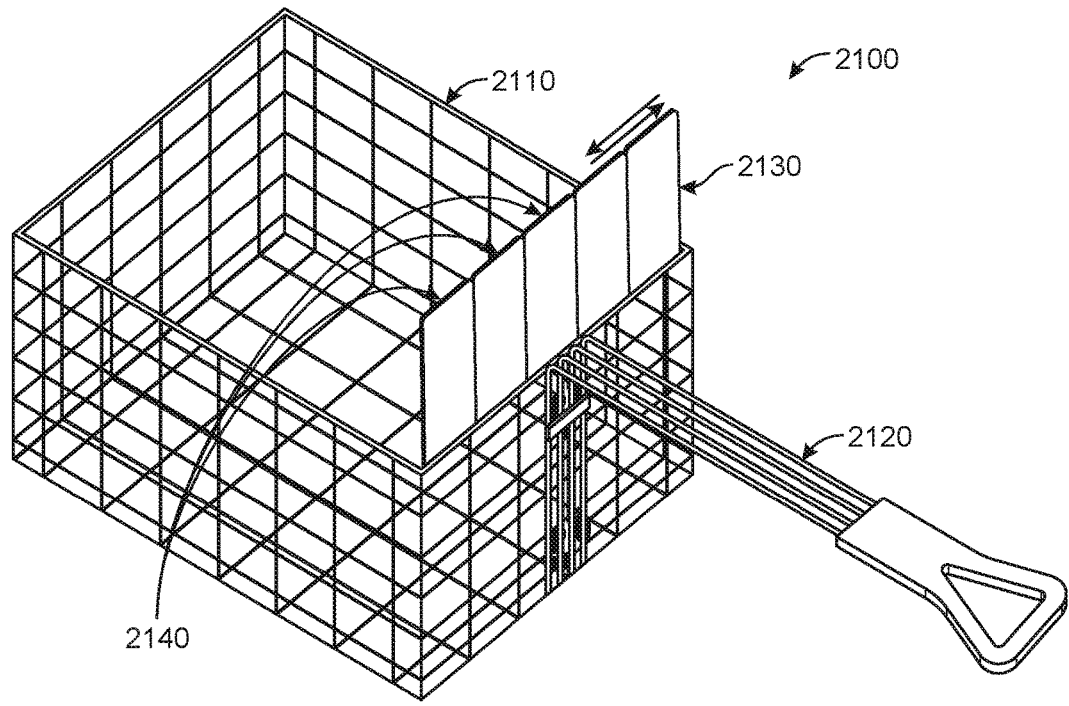
FIG. 21A is an isometric view of another example oil shield for a cookware.
Figure 21B:
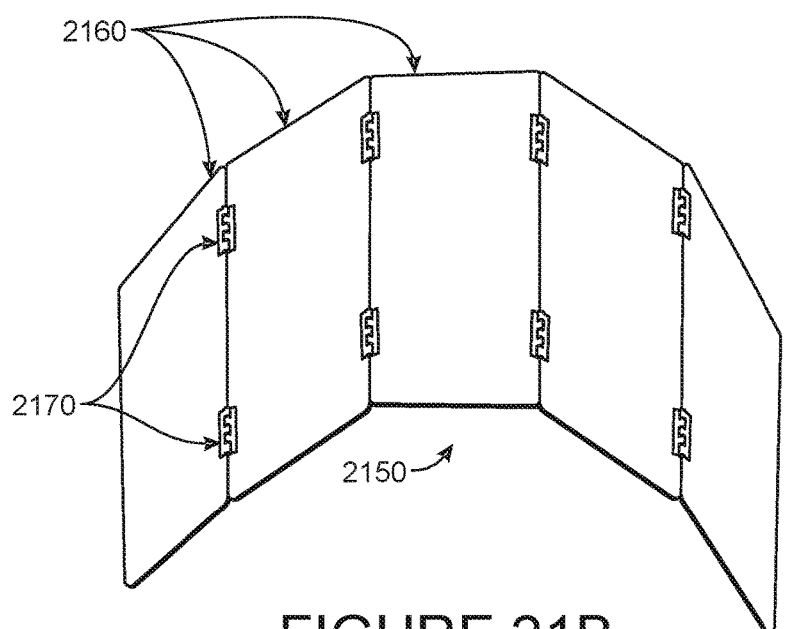
FIG. 21B is an isometric view of yet another example oil shield for a cookware.

FIG. 21A is an isometric view of another example shielded fryer basket 2100 with an oil shield 2130. In this embodiment the components 2140 of the oil-shield 2130 can slide right and left, over each other. The oil-shield 2130 may be detachably attached to any edge of the basket 2110 and preferably to the edge to which handle 2120 is attached. FIG. 21B is an isometric view of yet another example oil shield 2150 which has multiple foldable parts 2160 that can rotate around hinges 2170, with respect to each other. One of the advantaged of the embodiments of FIGS. 21A and 21B is that they can fit any size baskets.

Figure 22:
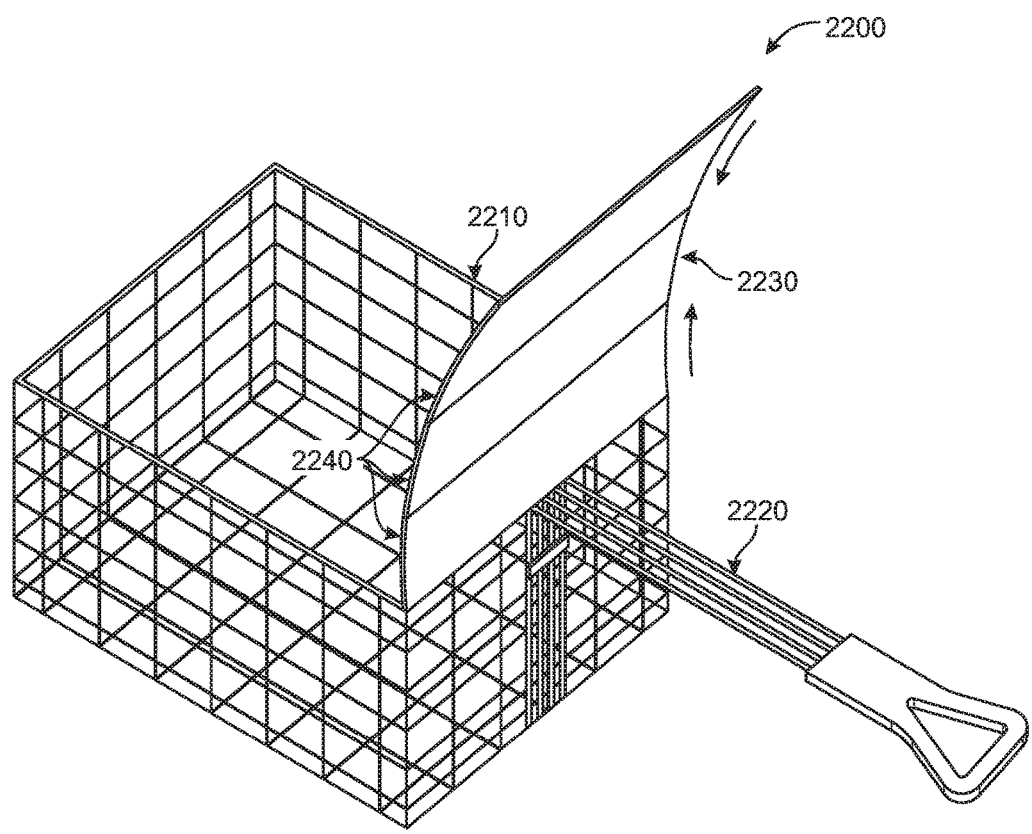
FIG. 22 is an isometric view of yet another example oil shield for a cookware.

FIG. 22 is an isometric view of yet another example shielded fryer basket 2200 with an oil shield 2230. In some embodiments the shield parts 2240 may slide up and down, over each other, while in other embodiments the entire oil-shield 2230 may move up and down in a track to protect a user's hand placed on handle 2220.

Figure 23:
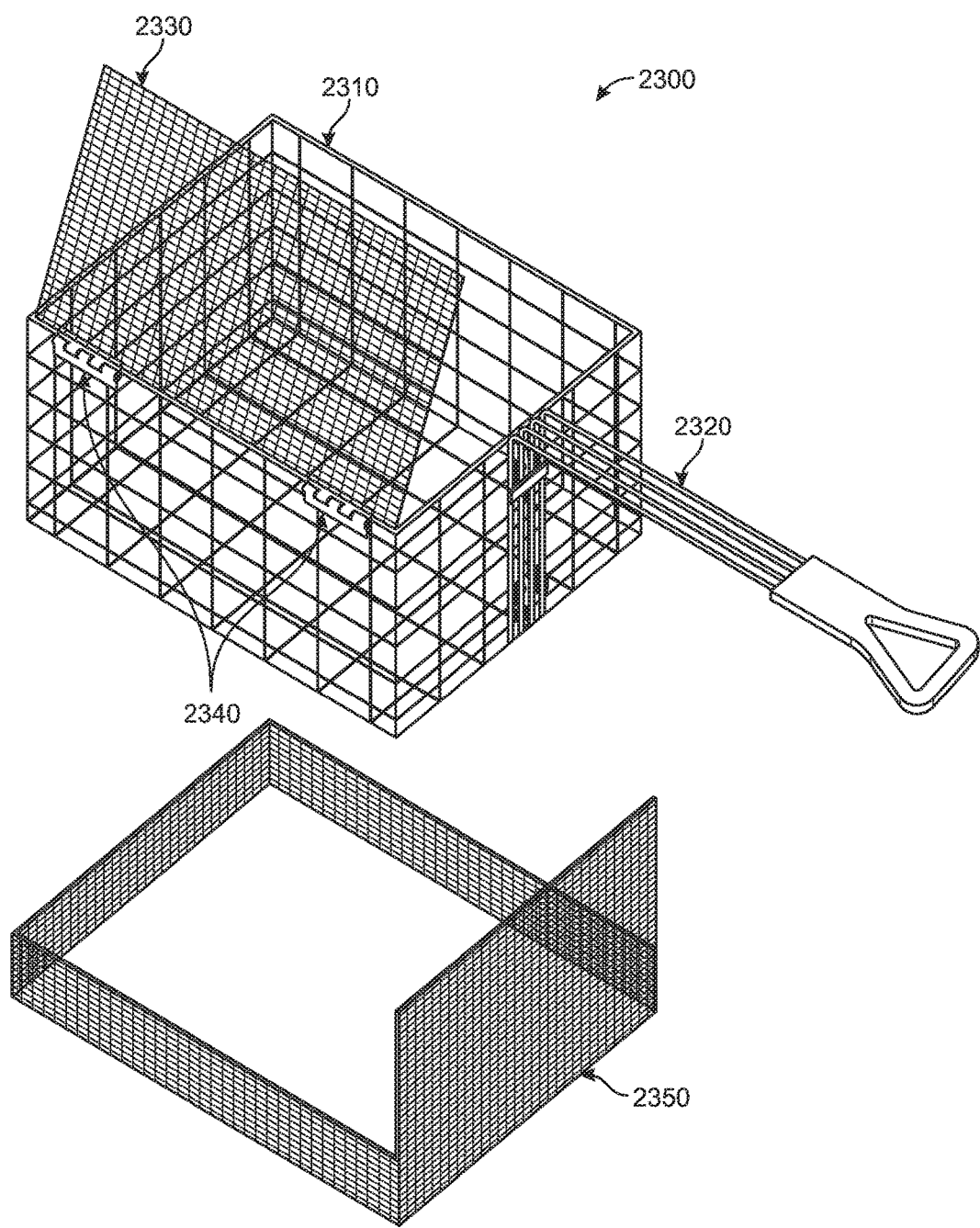
FIG. 23 is an isometric view of yet another example oil shield for a cookware.

FIG. 23 is an isometric view of yet another example shielded fryer basket 2300 with an oil shield 2330, to protect a user's hand placed on handle 2320. In this embodiment a wire-mesh plate 2330 is rotateably attached to an edge of basket 2310 by hinges 2340. In various embodiments a partial or a complete wire-mesh wall 2350 may be placed over, welded to, or clipped on the rim of basket 2310, instead or in addition to the wire-mesh plate 2330. The wire-mesh wall 2350 prevents the splashing oil from landing on the sides of the fryer or the floor. Each side of the wire-mesh wall 2350 may have different heights and may be flat or be curved towards outside or inside of the frying basket.

Figure 24:
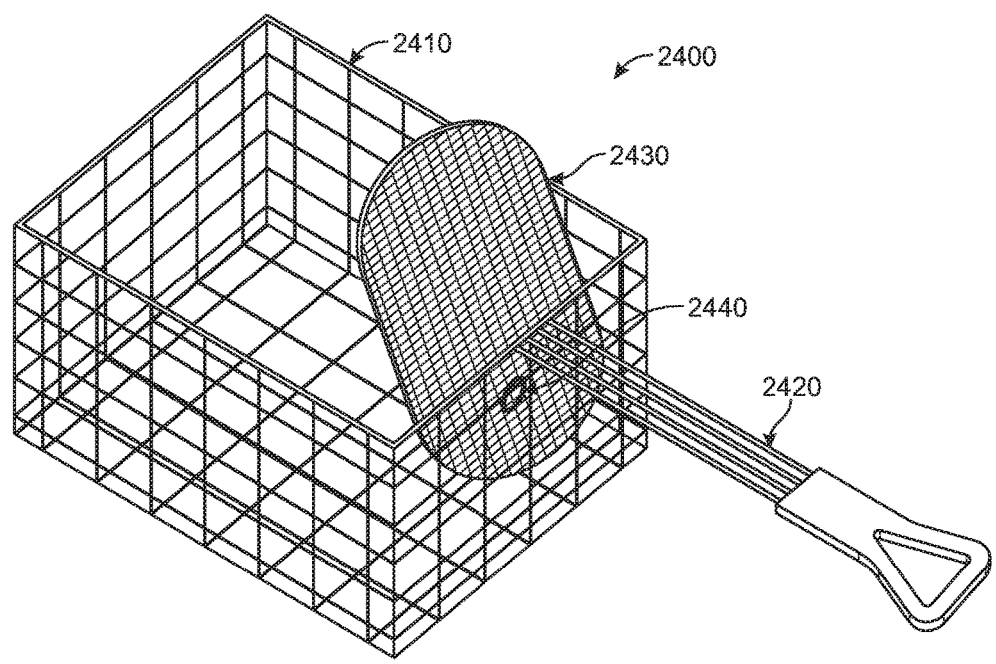
FIG. 24 is an isometric view of yet another example oil shield for a cookware.

FIG. 24 is an isometric view of yet another example shielded fryer basket 2400 with an oil shield 2430, to protect a user's hand placed on handle 2420. In this embodiment the oil-shield 2430 is rotateably hinged around an off-center pivot point 2440. Rotating shield 2430 around pivot point 2440, can erect a barrier on the path of a flying hot droplet of oil or remove the barrier, as desired.

Figure 25A:
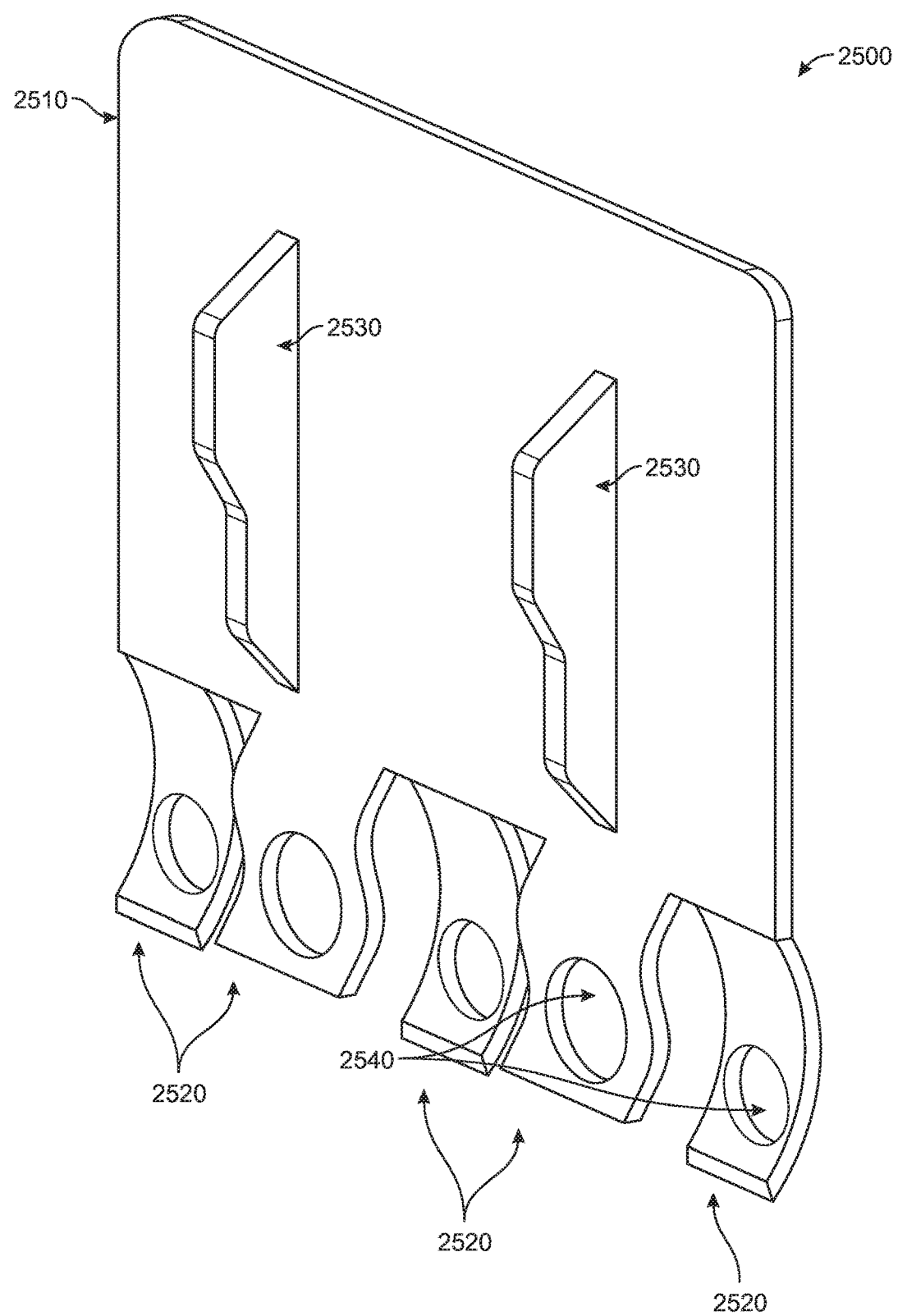
FIGS. 25A and 25B are isometric views of both sides of an example oil shield for a fryer basket.
Figure 25B:
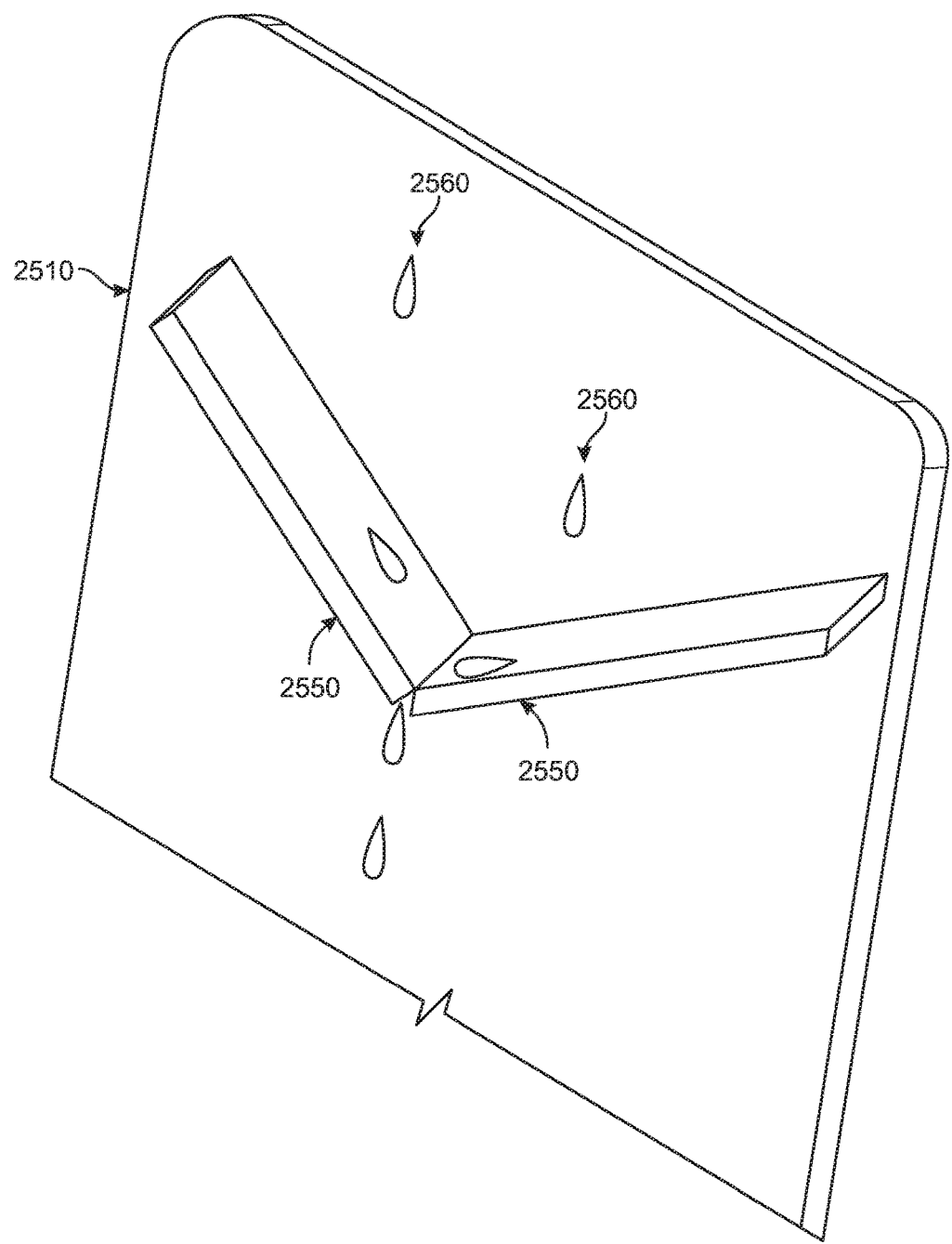

FIGS. 25A and 25B are isometric views of both sides of an example oil shield 2500 for a fryer basket. The oil-shield 2500 is to some extent similar to the embodiment of FIGS. 2A and 2B but has additional features. In the view shown in FIG. 25A, the oil-shield 2500 has one or more holes on one or more of its clamps 2520 to allow easy passage of oil in and out of the frying basket. Any of clamps 2520 may be as tall as the depth of the basket or shorter. The ribs 2530 reinforces the bending stress of plate 2510 and may be used as a convenient grip for handling the oil-shield 2500. These ribs 2530 may also straddle a part of the basket handle to prevent movement of the oil-shield 2500 relative to the frying basket.

In the view shown in FIG. 25B, the oil-shield 2500 has protruding slanted ridges/edges/ribs 2550, which are attached to the main plate 2510 and redirect the splashed oil droplets 2560 into the oil bay of the fryer. In various embodiments there may be more ridges than shown in FIG. 25B and in other embodiments the slanted ridges 2560 may not be connected in the middle and may create an open path there between. Additionally, these ribs prevent the oil droplets to travel upward as a result of vibration of the frying basket.

The above described moveable and hinged shields for the frying baskets may be moved or turned manually, automatically, mechanically, electrically, or magnetically, or the like. In various embodiments, the oil-shields may be spring loaded and pop up by releasing a simple latch.

Figure 26:
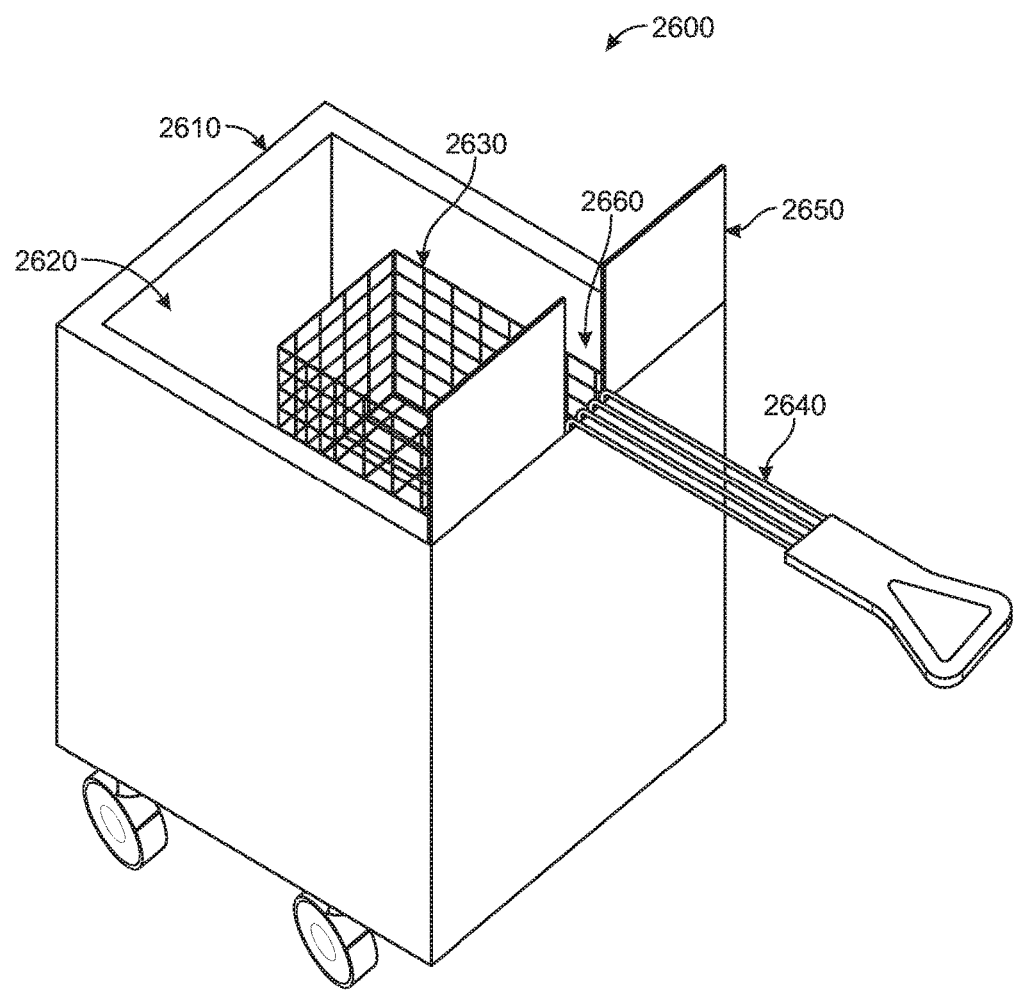
FIG. 26 is an isometric view of an example oil shield for a fryer.

FIG. 26 is an isometric view of an example shielded fryer 2600, with an oil shield 2650 attached to its front side. In this embodiment a one-piece or multiple-piece sheet of material 2650 is permanently or removeably attached to a front edge or a front side of the fryer 2610, in a substantially vertical configuration. The sheet of material 2650 is configured to form at least one narrow vertical open-ended slot 2660 such that to allow a frying basket handle 2640 to enter the slot 2660 and continue to travel downward until the frying basket 2630 is desirably immersed in a pool of oil inside the fryer oil-bay 2620.

Various principles of the present invention have been described in exemplary embodiments. However, many combinations and modifications of the above-described structures, arrangements, proportions, elements, materials, and components, used in the practice of the invention, in addition to those not specifically described, can be varied without departing from those principles. Various embodiments have been described as comprising automatic processes, but these processes may be performed manually without departing from the scope of the present invention.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A hand-shield for protecting a user's hand from flying hot liquid droplets and from convective and/or radiative heat while cooking in a basket having opposed wire-mesh side walls, opposed wire-mesh front and rear walls, a wire-mesh bottom, and an open top, the shield comprising a single-piece or a multiple-piece curved or flat plate of material configured to permanently or detachably attach to an edge or a wall of the basket and form a protective wall on a path of a droplet of splashing fluid, flying towards the user's hand.

2. The hand-shield of claim 1, wherein the multiple-piece oil shield is foldable.

3. The hand-shield of claim 1, wherein the oil shield has clamps to be attached to the basket edge.

4. The hand-shield of claim 1, wherein the oil shield folds over the cookware handle.

5. The hand-shield of claim 1, wherein the multiple-piece oil shield has two parts and is foldable and wherein one part of the oil shield is attached to the basket wall and/or edge and the other part rotates with respect to the attached part.

6. The hand-shield of claim 1, wherein the oil shield is made of a bent or a substantially flat sheet of material.

7. The hand-shield of claim 1, wherein the oil shield is made of plastic, metal, wood, durable, disposable, heat resistant, or any other natural or synthetic material.

8. The hand-shield of claim 1, wherein the oil shield also attaches, permanently or removably, to the handle.

9. A shield for a frying basket, the shield comprising a single-piece or a multiple-piece curved or a flat plate of material configured to permanently or detachably attach to an edge or a wall of the frying basket, to which edge and/or to which wall a frying basket handle is attached, and form a protective wall on a path of a droplet of hot fluid flying from inside or surrounding of the basket towards the user's hand.

10. The hand-shield of claim 9, wherein the multiple-piece oil shield is foldable, slideable, retractable or spring loaded.

11. The hand-shield of claim 9, wherein the oil shield is moveable relative to the basket.

12. The hand-shield of claim 9, wherein the oil shield has clamps to be also attached to the handle of the basket.

13. The hand-shield of claim 9, wherein the multiple-piece oil shield has two parts and is foldable and wherein one part of the oil shield may be folded over the handle of the basket.

14. The hand-shield of claim 9, wherein the oil shield is made of a substantially flat or a bent sheet of material.

15. The hand-shield of claim 9, wherein the oil shield is made of plastic, metal, wood, or any other natural or synthetic material and wherein the oil shield is made of a solid or a perforated material.

16. The hand-shield of claim 9, wherein pieces of the multiple-piece oil shield move horizontally, vertically, or rotate around a pivot point.

17. A heat- and oil-shield for a fryer basket that has a handle, the heat- and oil-shield comprising a one-piece or multiple-piece sheet of material permanently or removeably attachable to an edge or a side of the fryer that is closest to the fryer basket handle.

18. The heat- and oil-shield of claim 17, wherein the shield includes one or more clamps, hinges, or magnets to be attached to the fryer basket.

19. The heat- and oil-shield of claim 17, wherein the multiple-piece shield is foldable or non-foldable.

20. The heat- and oil-shield of claim 17, wherein the one-piece shield is made of a flat or bent sheet of material.

* * * * *